United States Patent
Beall et al.

(10) Patent No.: US 10,940,421 B2
(45) Date of Patent: Mar. 9, 2021

(54) PATTERN-PLUGGED HONEYCOMB BODIES, PARTICULATE FILTERS, AND EXTRUSION DIES THEREFOR

(71) Applicant: Corning Incorporated, Corning, NY (US)

(72) Inventors: Douglas Munroe Beall, Painted Post, NY (US); Dana Craig Bookbinder, Corning, NY (US); Pushkar Tandon, Painted Post, NY (US)

(73) Assignee: Corning Incorporated, Corning, NY (US)

(*) Notice: Subject to any disclaimer, the term of this patent is extended or adjusted under 35 U.S.C. 154(b) by 33 days.

(21) Appl. No.: 16/481,254

(22) PCT Filed: Jan. 31, 2018

(86) PCT No.: PCT/US2018/016134
§ 371 (c)(1),
(2) Date: Jul. 26, 2019

(87) PCT Pub. No.: WO2018/144532
PCT Pub. Date: Aug. 9, 2018

(65) Prior Publication Data
US 2019/0374896 A1    Dec. 12, 2019

Related U.S. Application Data

(60) Provisional application No. 62/452,770, filed on Jan. 31, 2017.

(51) Int. Cl.
*B01D 46/24* (2006.01)
*F01N 3/022* (2006.01)

(52) U.S. Cl.
CPC ....... *B01D 46/247* (2013.01); *B01D 46/2429* (2013.01); *B01D 46/2459* (2013.01);
(Continued)

(58) Field of Classification Search
CPC ............ B01D 46/247; B01D 46/2429; B01D 46/2459; B01D 46/2474; F01N 3/0222; F01N 2330/06
(Continued)

(56) References Cited

U.S. PATENT DOCUMENTS 3,885,977 A     5/1975  Lachman et al.
4,417,908 A  *  11/1983 Pitcher, Jr. ......... B01D 46/0001
                                                          55/523
(Continued)

FOREIGN PATENT DOCUMENTS

JP       2010053697 A       3/2010

OTHER PUBLICATIONS

International Search Report and Written Opinion of the International Searching Authority; PCT/US2018/016134; dated May 28, 2019; 13 Pages; European Patent Office.

*Primary Examiner* — Tom P Duong
(74) *Attorney, Agent, or Firm* — Joseph M. Homa

(57) ABSTRACT

A honeycomb body having intersecting porous walls which includes first through fourth cells, wherein the cells extend from inlet to outlet face and are plugged to define a repeating structural unit with three inlets and one outlet channel. Repeating structural unit includes a first channel including length $L_1$, width $W_2$, and area $A_1$, a second channel including length $L_2$, the width $W_2$, and area $A_2$, a third channel including the length $L_1$, width $W_1$, and area $A_3$, and a fourth channel including the length $L_2$, the width $W_1$, and $A_4$, wherein the first through third channels are inlets and the fourth channel is a rectangular outlet and at least one of $W_1 > W_2$ and $L_1 \neq L_2$, i.e. $W_1 > W_2$, or $L_1 \neq L_2$, or $W_1 > W_2$ and $L_1 \neq L_2$. Repeating structural unit has a quadrilateral outer perimeter. Particulate filters including the honeycomb body, (Continued)

honeycomb extrusion dies, and methods of manufacturing the honeycomb body are provided.

29 Claims, 11 Drawing Sheets

(52) U.S. Cl.
CPC ....... B01D 46/2474 (2013.01); F01N 3/0222 (2013.01); B01D 2046/2433 (2013.01); B01D 2046/2437 (2013.01); B01D 2046/2481 (2013.01); B01D 2046/2496 (2013.01); B01D 2279/30 (2013.01); F01N 2330/06 (2013.01); F01N 2330/34 (2013.01)

(58) Field of Classification Search
USPC .............................. 422/180; 55/523; 428/116
See application file for complete search history.

(56) References Cited

U.S. PATENT DOCUMENTS

| | | | |
|---|---|---|---|
| 4,557,773 A | 12/1985 | Bonzo | |
| 5,332,703 A | 7/1994 | Hickman | |
| 6,221,308 B1 | 4/2001 | Peng | |
| 6,259,078 B1 | 7/2001 | Araya | |
| 6,391,813 B1 | 5/2002 | Merkel | |
| 6,541,407 B2 | 4/2003 | Beall et al. | |
| 6,673,300 B2 | 1/2004 | Allen et al. | |
| 6,696,132 B2 | 2/2004 | Beall et al. | |
| 7,017,278 B2 | 3/2006 | Kato | |
| 7,208,214 B2 | 4/2007 | Ichikawa | |
| 7,316,722 B2 * | 1/2008 | Komori | F01N 3/0222 55/523 |
| 7,556,782 B2 * | 7/2009 | Ohno | C04B 38/0012 422/180 |
| 7,596,885 B2 | 10/2009 | Adrian et al. | |
| 7,744,669 B2 | 6/2010 | Paisley et al. | |
| 7,922,951 B2 | 4/2011 | Mudd et al. | |
| 8,346,710 B2 * | 1/2013 | Chan | G06Q 30/02 706/52 |
| 8,435,441 B2 | 5/2013 | Bookbinder et al. | |
| 8,974,724 B2 | 3/2015 | Day et al. | |
| 9,005,517 B2 | 4/2015 | Bronfenbrenner et al. | |
| 9,038,284 B2 | 5/2015 | Feldman et al. | |
| 9,132,578 B2 | 9/2015 | Anthony et al. | |
| 9,335,093 B2 | 5/2016 | Feldman et al. | |
| 9,394,814 B2 * | 7/2016 | Shibata | B01D 46/247 |
| 9,446,560 B2 | 9/2016 | Bronfenbrenner et al. | |
| 9,452,578 B2 | 9/2016 | Bronfenbrenner et al. | |
| 9,803,596 B2 * | 10/2017 | Miyairi | B01D 46/2418 |
| 2004/0170803 A1 * | 9/2004 | Ichikawa | B01D 46/247 428/116 |
| 2005/0016141 A1 | 1/2005 | Hong et al. | |
| 2005/0076627 A1 * | 4/2005 | Itou | B01D 39/2068 55/523 |
| 2014/0084505 A1 | 3/2014 | Vileno et al. | |
| 2015/0033691 A1 * | 2/2015 | Shibata | F01N 3/0222 55/523 |
| 2016/0067653 A1 | 3/2016 | Miyairi et al. | |
| 2019/0126186 A1 | 5/2019 | Beall et al. | |

\* cited by examiner

"Enlarged View"

"Enlarged View"

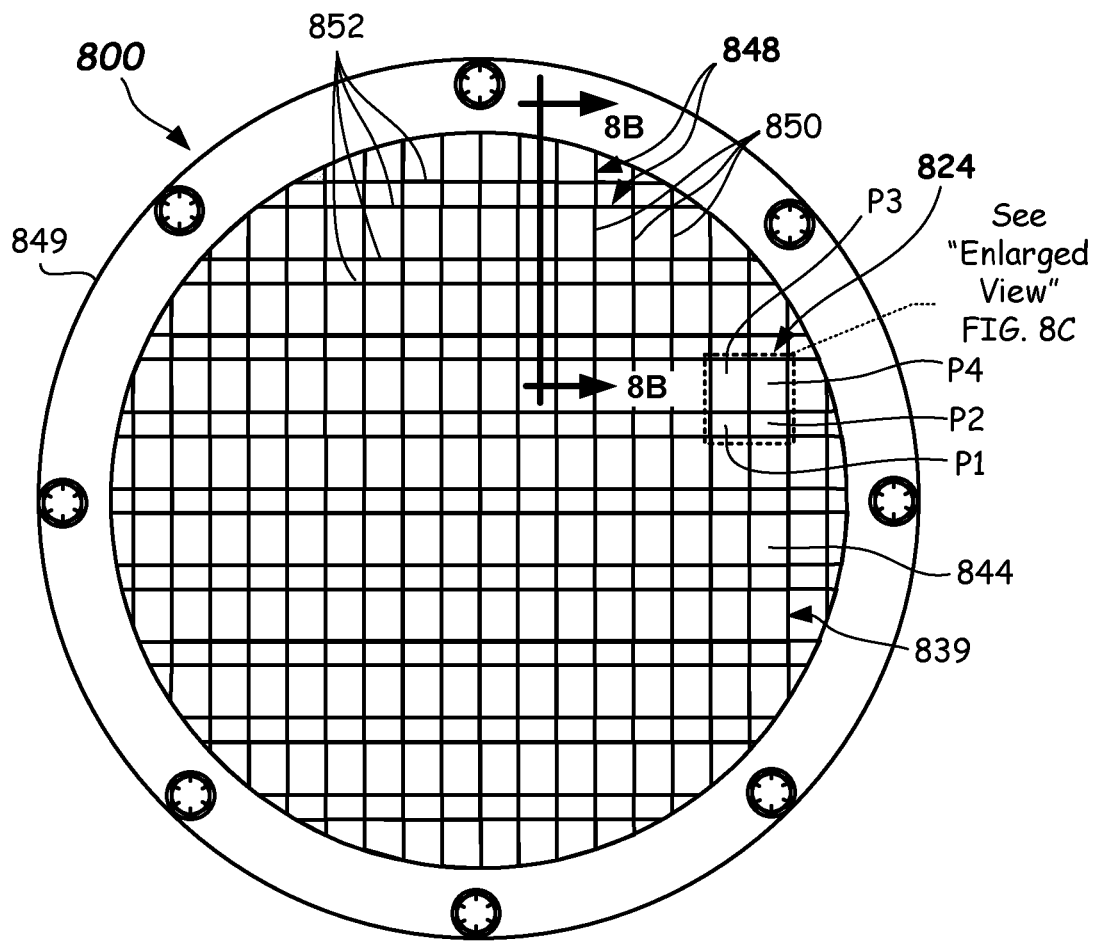
FIG. 8A
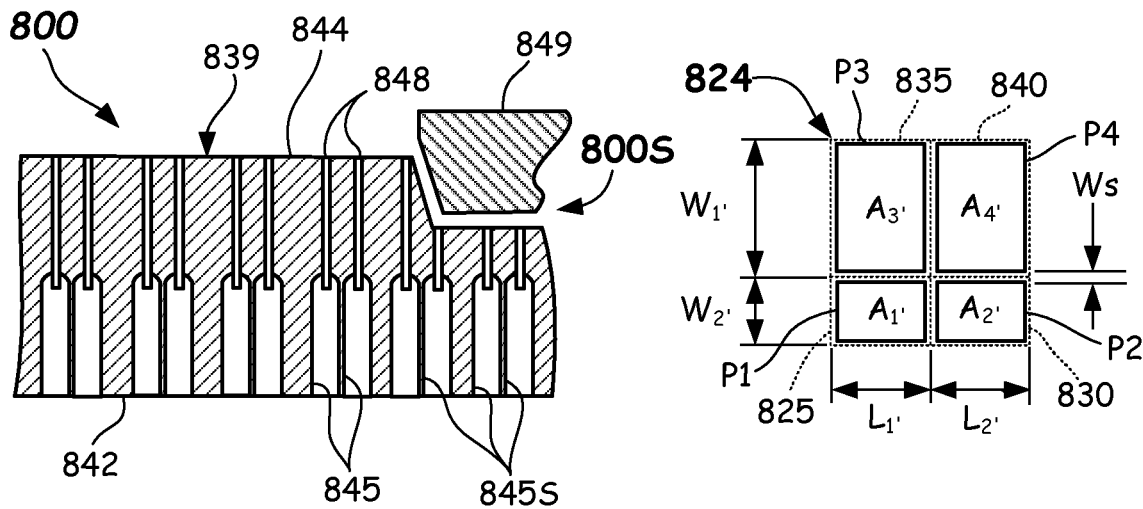
FIG. 8B
FIG. 8C

PATTERN-PLUGGED HONEYCOMB BODIES, PARTICULATE FILTERS, AND EXTRUSION DIES THEREFOR

CROSS-REFERENCE TO RELATED APPLICATIONS

This application is a National Stage application under 35 U.S.C. § 371 of International Application No. PCT/US2018/016134, filed on Jan. 31, 2018, which claims the benefit of priority under 35 U.S.C. § 119 of U.S. Provisional Application Ser. No. 62/452,770, filed on Jan. 31, 2017, the contents of which are incorporated herein by reference in their entireties.

FIELD

The disclosure relates to honeycomb bodies, and more particularly to porous ceramic honeycomb bodies such as for particulate filters suitable for filtering particles from a fluid stream, such as engine exhaust, and extrusion dies therefor.

BACKGROUND

Honeycomb particulate filters typically include a honeycomb body having a plurality of intersecting porous ceramic walls forming axially-extending channels of the same cross-sectional area. Half of these channels are plugged on the inlet side in a checkerboard pattern with these same channels being unplugged on the outlet side, thus forming outlet channels. The other half of the axially-extending channels are plugged in a checkerboard pattern on the outlet side and unplugged on the inlet side, thus forming inlet channels. In use, engine exhaust flows through the porous ceramic walls of the honeycomb body and particles (soot and other inorganic particles) are filtered from the engine exhaust stream.

Some honeycomb filter configurations have included a modification of the honeycomb structure of the honeycomb body to include inlet channels having larger cross-sectional area than the outlet channels (i.e., higher inlet open frontal area). Relatively-larger inlet channels have effectively reduced the severity of pressure drop increases as soot and ash loading increase over time. However, making larger and larger inlet cells (and/or smaller and smaller outlet cells) may cause the honeycomb structures to become relatively expensive to manufacture, and may lead to other performance limitations. Accordingly, honeycomb body designs having relatively high soot and ash carrying capability, improved pressure drop performance, and inexpensive manufacture are sought.

SUMMARY

In one aspect, a honeycomb body is provided. The honeycomb body comprises intersecting porous walls in a matrix comprising a pattern of repeating structural units. Each repeating structural unit comprises a first cell, a second cell, a third cell, and a fourth cell, wherein the cells extend parallel to each other in an axial direction from an inlet face to an outlet face and have a quadrilateral cross-section in a transverse plane orthogonal to the axial direction. The cells are plugged to define inlet channels and outlet channels within the repeating structural unit, wherein each repeating structural unit comprises a first channel formed from the first cell comprising, in transverse cross-section, a length $L_1$, a width $W_2$, and a cross-sectional area $A_1$, the first channel having a first sidewall and a second sidewall orthogonal to the first sidewall, a second channel formed from the second cell and comprising, in transverse cross-section, a length $L_2$, the width $W_2$, and a cross-sectional area $A_2$, and sharing the second sidewall with the first channel, a third channel formed from the third cell comprising, in transverse cross-section, the length $L_1$, a width $W_1$, and a cross-sectional area $A_3$, comprising a third sidewall and sharing the first sidewall with the first channel, and a fourth channel formed from the fourth cell and comprising, in transverse cross-section, the length $L_2$, the width $W_1$, and a cross-sectional area $A_4$, and sharing a fourth sidewall with the second channel and the third sidewall with the third channel. The first, second and third channels comprise inlet channels and the fourth channel comprises an outlet channel having a rectangular shape in transverse cross-section, and wherein at least one of $W_1 \geq W_2$ and $L_1 \neq L_2$, i.e. either $W_1 \geq W_2$, or $L_1 \neq L_2$, or $W_1 \geq W_2$ and $L_1 \neq L_2$. Moreover, the repeating structural unit comprises a quadrilateral outer perimeter.

In another aspect, a honeycomb body is provided. The honeycomb body comprises intersecting porous walls in a matrix comprising a pattern of repeating structural units. The repeating structural units have 0.006 inch (0.152 mm)≤Tw≤0.010 inch (0.254 mm), 40%≤% P≤60%, 10 microns≤MPS≤16 microns, and 38%≤inlet OFA≤62%, wherein each of the repeating structural units comprises a first cell, a second cell, a third cell, and a fourth cell. The cells extend parallel to each other in an axial direction from an inlet face to an outlet face and have a quadrilateral cross-section in a transverse plane orthogonal to the axial direction. The cells are plugged to define inlet channels and outlet channels within the repeating structural unit, wherein each of the repeating structural units comprises a first channel formed from the first cell comprising, in transverse cross-section, a length $L_1$, a width $W_2$, and a cross-sectional area $A_1$, the first channel having a first sidewall and a second sidewall orthogonal to the first sidewall, a second channel formed from the second cell and comprising, in cross-section, a length $L_2$, the width $W_2$, and a cross-sectional area $A_2$, and sharing the second sidewall with the first channel, a third channel formed from the third cell comprising, in cross-section, the length $L_1$, a width $W_1$, and a cross-sectional area $A_3$, and comprising a third sidewall and sharing the first sidewall with the first channel, and a fourth channel formed from the fourth cell and comprising, in cross-section, the length $L_2$, the width $W_1$, and a cross-sectional area $A_4$, and sharing a fourth sidewall with the second channel and the third sidewall with the third channel. The first, second, and third channels comprise inlet channels and the fourth channel comprises an outlet channel having a rectangular shape in transverse cross-section, wherein at least one of $W_1 \geq W_2$ and $L_1 \neq L_2$, and the repeating structural unit comprises a quadrilateral outer perimeter. Tw is a transverse wall thickness, % P is an open porosity of the porous walls, MPS is a median pore size (D50), and inlet OFA is an inlet open area of the honeycomb body.

In another aspect, a honeycomb extrusion die is provided. The honeycomb extrusion die comprises a die body, an inlet face, an outlet face opposite from the inlet face, a plurality of feedholes extending from the inlet face into the die body, and an intersecting array of slots extending into the die body from the outlet face and connecting with the plurality of feedholes. The intersecting array of slots comprise first slots extending entirely across the outlet face, and a second set of slots orthogonal to the first slots and also extending entirely across the outlet face. The intersecting array of slots form an array of repeating unit die cells, wherein the repeating unit die cell comprises a first die component comprising, in cross-section, a length $L_{1'}$, a width $W_{2'}$, and a cross-sectional area $A_{1'}$, a second die component comprising in cross-section, a length $L_{2'}$, the width $W_{2'}$, and a cross-sectional area $A_{2'}$, a third die component comprising, in cross-section, the length $L_{1'}$, a width $W_{1'}$, and a cross-sectional area $A_{3'}$, and a fourth die component comprising, in cross-section, the length $L_{2'}$, the width $W_{1'}$, and a cross-sectional area $A_{4'}$, wherein the fourth die component comprises a rectangular shape in cross-section. An outer peripheral shape of the unit die cell is a quadrilateral. The configuration of the die components is selected to provide at least one of a first configuration or a second configuration, wherein: the first configuration is $W_{1'}>W_{2'}$ and $L_{1'}=L_{2'}$ and $A_{4'}=A_{3'}>A_{2'}=A_{1'}$, and the second configuration is selected from one of:

$L_{1'}\neq L_{2'}$ and $A_{4'}>A_{3'}>A_{2'}<A_{1'}$,
$L_{1'}\neq L_{2'}$ and $A_{4'}>A_{2'}>A_{3'}<A_{1'}$,
$L_{1'}\neq L_{2'}$ and $A_{3'}>A_{4'}>A_{1'}<A_{2'}$, or
$L_{1'}\neq L_{2'}$ and $W_{1'}=W_{2'}$ and $A_{4'}=A_{2'}>A_{3'}=A_{1'}$.

Numerous other features and aspects are provided in accordance with these and other embodiments of the disclosure. Further features and aspects of embodiments will become more fully apparent from the following detailed description, the appended claims, and the accompanying drawings.

BRIEF DESCRIPTION OF THE DRAWINGS

The accompanying drawings, described below, are for illustrative purposes and are not necessarily drawn to scale. The drawings are not intended to limit the scope of the disclosure in any way. Like numerals are used throughout the specification and drawings to denote like elements.

FIG. 8A illustrates a partial front view of a honeycomb extrusion die used to manufacture one or more embodiments of the inventive honeycomb body.

FIG. 8B illustrates a partial cross-sectioned side view of a honeycomb extrusion die of FIG. 8A taken along section line 8B-8B according to one or more embodiments.

FIG. 8C illustrates an enlarged front view of a die unit cell of the honeycomb extrusion die of FIG. 8A according to one or more embodiments.

DETAILED DESCRIPTION

Figure 1A:
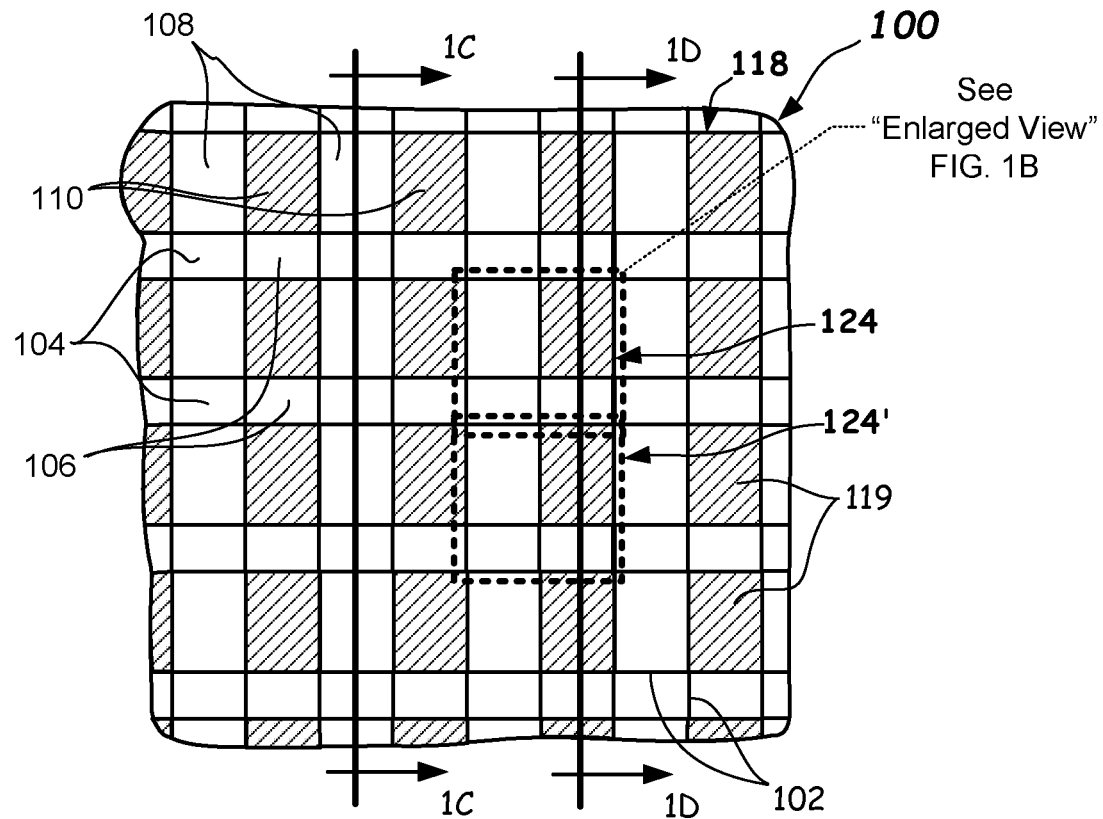
FIG. 1A illustrates a partial end view of an inlet side of a honeycomb body according to one or more embodiments.

Reference will now be made in detail to the example embodiments of this disclosure, which are illustrated in the accompanying drawings. In describing the embodiments, numerous specific details are set forth in order to provide a thorough understanding of the disclosure. However, it will be apparent to one skilled in the art that the invention may be practiced without some or all of these specific details. In other instances, well-known features and/or process steps have not been described in detail so as not to unnecessarily obscure the invention. Features of the various embodiments described herein may be combined with each other, unless specifically noted otherwise.

In various embodiments, the present disclosure relates to honeycomb bodies that can be configured for use as a wall-flow filter comprised of a plugged honeycomb structure body, such as a Gasoline Particulate Filter (GPF) or a Diesel Particulate Filter (DPF). In various embodiments, filters disclosed herein preferably can provide excellent storage capacity of soot and/or ash or other inorganic particles in the honeycomb body relative to currently-available particulate filter designs, and further preferably does so while maintaining relatively-low clean pressure drop and relatively-low pressure drop increase across the filter as a function of soot and/or ash loading.

A particulate filter (e.g. GPF or DPF) collects soot particles and ash and can trap inorganic materials that may be present in the soot or that may flake off from engine or exhaust components, such as a manifold. Inorganic materials typically do not burn out along with the soot via regeneration, and therefore inorganic matter could build up with the ash over time within the particulate filter. Such build up may eventually result in a pressure drop increase across the honeycomb body, which may be unacceptably high. To alleviate this pressure increase, maintenance of the particulate filter may be undertaken via removal and replacement with a new filter or cleaned filter that has had ash and inorganic material removed, leading to more costs.

Thus, in accordance with one or more embodiments of the present disclosure, a honeycomb body is provided with high ash/inorganic storage capacity to provide for longer times between service intervals, and which preferably limits a pressure drop increase penalty as a function of soot and/or ash loading. Moreover, one or more embodiments of the present disclosure may provide manufacturing benefits because relatively inexpensive existing extrusion die manufacturing technologies could be utilized. For example, in one or more embodiments, straight line die cuts from side-to-side entirely across the extrusion die outlet face (e.g., in a single direction, or even in two orthogonal directions) may be used. For example, relatively inexpensive cutting wheels and/or wire electron discharge machining (wire EDM) die manufacturing technologies may be used, which may dramatically lower die cost compared to other techniques such as plunge EDM or ECM. Moreover, one or more embodiments may benefit from improved structural rigidity of the honeycomb body, in the green state and/or in the fired state.

One or more embodiments of the honeycomb body comprise intersecting porous walls in a matrix comprising a pattern of repeating structural units. Each of the repeating structural units comprises a first cell, a second cell, a third cell, and a fourth cell, wherein the cells all extend parallel to each other in an axial direction from an inlet face to an outlet face. Each cell has a quadrilateral shape in cross-section in a transverse plane orthogonal to the axial direction (hereinafter "transverse cross-section"). The respective cells of the repeating structural units are plugged to define inlet channels and outlet channels therein. Each of the repeating structural units comprises a first channel formed from the first cell comprising, in transverse cross-section, a length $L_1$, a width $W_2$, and a cross-sectional area $A_1$, the first channel comprising a first sidewall and a second sidewall orthogonal to the first side wall. Each of the repeating structural units comprises a second channel formed from the second cell and comprising, in transverse cross-section, a length $L_2$, the width $W_2$, and a cross-sectional area $A_2$, and sharing the second sidewall with the first channel. A third channel of each of the "repeating structural units" is formed from the third cell and comprises, in transverse cross-section, the length $L_1$, a width $W_1$, and a cross-sectional area $A_3$, comprising a third sidewall and sharing first sidewall with the first channel. A fourth channel of each of the "repeating structural units" is formed from the fourth cell and comprises, in transverse cross-section, the length $L_2$, the width $W_1$, and a cross-sectional area $A_4$, and sharing a fourth sidewall with the second channel and the third sidewall with the third channel. The first channel, the second channel, and the third channel comprise inlet channels and the fourth channel comprises an outlet channel with a rectangular shape in transverse cross-section, and wherein at least one of $W_1 \geq W_2$ and $L_1 \neq L_2$, and the repeating structural unit comprises a quadrilateral outer perimeter. In some embodiments, $W_1 > W_2$ and $L_2 = L_1$. In other embodiments, $W_1 > W_2$ and $L_2 \geq L_1$. In yet other embodiments, $W_1 > W_2$ and $0.5 \leq L_2/L_1 \leq 1.25$, for example. Other combinations of $W_1$, $W_2$, $L_1$, and $L_2$ are possible.

Other structural and microstructural attributes of embodiments of the repeating structural unit providing one or more of the afore-mentioned performance benefits are described fully herein.

As used herein "honeycomb body" means a wall-flow honeycomb body configured to be accepted into and used in a can or housing, comprising open and interconnected porosity, a matrix of intersecting cell walls, and comprising at least some plugged inlet channels and at least some plugged outlet channels.

In other embodiments of the disclosure, particulate filters comprising the honeycomb bodies, exhaust systems comprising particulate filters, extrusion dies for manufacturing the inventive honeycomb bodies, as well as methods of filtering particulates and manufacturing the honeycomb bodies are provided, as are other aspects and features.

Further details of example honeycomb bodies, particulate filters, exhaust systems comprising particulate filters, extrusion dies for manufacturing the honeycomb bodies described herein, and methods of filtering particulates and manufacturing of the honeycomb bodies are described with reference to FIGS. 1A-10 herein.

FIGS. 1A-1F illustrates various views, respectively, of a first example embodiment of a honeycomb body 100 according to the present disclosure. The honeycomb body 100 is has utility for use as a filtering media in a particulate filter, which is used for filtering particulates (e.g., soot and/or inorganics) from a flow stream such as from an engine exhaust stream of an internal combustion engine (e.g., gas or diesel engine). The honeycomb body 100 comprises porous walls 102 that intersect with one another (e.g., at right angles) and form a plurality of longitudinally-extending cells that are parallel with one another. The porous walls 102 may comprise open, interconnected porosity and the porous walls 102 may be made of a ceramic or other suitable porous material that can withstand high temperatures in use, such as those encountered during thermal regeneration of the honeycomb body 100. For example, the intersecting porous walls 102 may be made of a ceramic material, such as cordierite, silicon carbide (SiC), aluminum titanate, mullite, alumina ($Al_2O_3$), silicon aluminum oxynitride ($Al_6O_2N_6Si$), mullite, zeolite, combinations of the afore-mentioned, and the like. Other suitable porous materials may be used, such as fused silica or porous metal, or combinations thereof.

In the case of ceramics, walls 102 may be formed during an extrusion process wherein a suitable batch mixture (such as inorganic and organic batch components and a liquid vehicle such as water) are extruded through a honeycomb extrusion die and then dried and further fired to produce a porous ceramic honeycomb body (without plugs). The ceramic honeycomb body may then be plugged in a defined plugging pattern described herein to produce the honeycomb bodies 100. Plugging may be accomplished as described in U.S. Pat. No. 6,673,300 to Allen et al or by other methods. In some embodiments, the dried green honeycomb body may be plugged and then fired, or alternatively partially fired, plugged, and fired again. Various microstructural attributes of the material of the porous walls 102 are described herein.

The honeycomb body 100 may comprise a skin 103 (FIG. 1E-1F) on an outer radial periphery defining an outer peripheral surface 100S of the honeycomb body 100. The skin 103 may be extruded along with extrusion of the honeycomb matrix structure or may be applied to the honeycomb body post-extrusion (post-drying, or post-firing), for example in some embodiments an after-applied skin applied as ceramic-based skin cement onto an outer periphery (e.g., machined periphery) of a ceramic or dried green body honeycomb body. The skin 103 may comprise a skin thickness Ts (FIG. 1E) that is substantially uniform about the radial periphery of the honeycomb body 100, for example. The skin thickness Ts may be between about 0.1 mm to 100 mm, or even between 1 mm to 10 mm, for example. Other skin thicknesses Ts may be used. Apparatus and methods for skinning articles, such as honeycomb bodies are described in U.S. Pat. No. 9,132,578, for example. Other suitable skinning methods may be used. In some embodiments described herein, the intersecting porous walls 102 may advantageously extend continuously across the honeycomb body 100 between sections of the skin 103, such as to obtain benefits in terms of reducing extrusion die cost. In other embodiments, the matrix of cell walls comprises one or more configurations within the same honeycomb body.

The outermost cross-sectional shape of the honeycomb body 100 may be a circle, an ellipse, an oval, or a racetrack shape, but the honeycomb body 100 is not limited to these cross-sectional shapes. Other cross-sectional shapes may be used, such as triangular or tri-lobed, square, or rectangular shapes.

The repeating structural unit comprises a plurality of cells, comprising a first cell 104, a second cell 106, a third cell 108, and a fourth cell 110, wherein at least some of the cells have a different cross-sectional shape in transverse cross-section than the other cells of the repeating structural unit 124. In some embodiments, the plurality of cells 104-110 may be constituted of two different types of cell shapes, in cross-section, such as combinations of different quadrilateral cell shapes, such as combinations of rectangular cell shapes and square cell shapes. "Rectangular" as used herein means a quadrilateral having four sides and 90 degree corners, wherein a first two sides are of equal length and second two sides are of equal length, and which have a length different than the length of the first two sides. "Quadrilateral" as used herein means a four-sided polygon having four and only four straight sides. In other embodiments, the plurality of cells 104-110 may be constituted of four different types of cell shapes, in transverse cross-section, such as combinations of different-sized rectangular cells. All of the first cell 104, second cell 106, third cell 108, and fourth cell 110 may extend parallel to one another along an axial axis 112 from an inlet face 114 to an outlet face 116, wherein the inlet face 114 and outlet face 116 are generally opposed to one another as shown in FIGS. 1C and 1D. The transverse cross-sectional area of each cell 104-110 may be constant along its length. Moreover, the transverse wall thickness Tw of the porous walls 102 may be constant along a length of the porous walls 102.

In one or more embodiments, the first cell 104, second cell 106, third cell 108, and fourth cell 110 are plugged in a plugging pattern 118 and the surfaces of the plugs and the cells 104-110 together define inlet channels 120 and outlet channels 122. Some of the cells 104, 106, 108, 110 are plugged at or near the outlet face 116, but are unplugged at or near the inlet face 114 and are defined herein as inlet channels 120. Others of the cells 104, 106, 108, 110 are plugged at or near the inlet face 114, but are unplugged at or near the outlet face 116 and are defined herein as outlet channels 122. In the depicted embodiment, all of the cells 104, 106, 108, 110 of the repeating structural unit 124 may be plugged at least at or near one end, i.e., none are unplugged. However, in some embodiments, certain ones of the cells may be intentionally left unplugged along a length thereof, so as to provide one or more flow through channels in the honeycomb body.

In embodiments, the number of inlet channels 120 may be greater than the number of outlet channels 122 in the honeycomb body 100 and in the repeating structural unit 124. In embodiments, a number of inlet channels 120 may be three times the number of outlet channels 122. The plugs 119 of the plugging pattern 118 may be formed from a suitable plugging material such as a ceramic plug material, comprising cordierite, aluminum titanate, mullite, silicon carbide, and/or other materials that can withstand high temperatures, such as those encountered during thermal regeneration of the honeycomb body 100. Suitable powdered inorganic material(s) may be mixed with an organic binder and liquid vehicle, for example, to produce the plugging material. Suitable non-limiting plugging materials and processes are described in U.S. Pat. Nos. 4,557,773, 6,673,300, 7,744,669, and 7,922,951, for example. The plugs 119 may or may not be flush with the inlet face 114 and outlet face 116. Plugs 119 may fill the channel width and height and may have a plug depth along the axial axis 112 of between about 0.004 inch (0.10 mm) and about 0.100 inch (2.54 mm), or even between about 0.004 inch (0.10 mm) and about 0.06 inch (1.52 mm), for example. Other plug depths may be used. The plugs 119 may comprise open interconnected porosity.

Figure 1B:
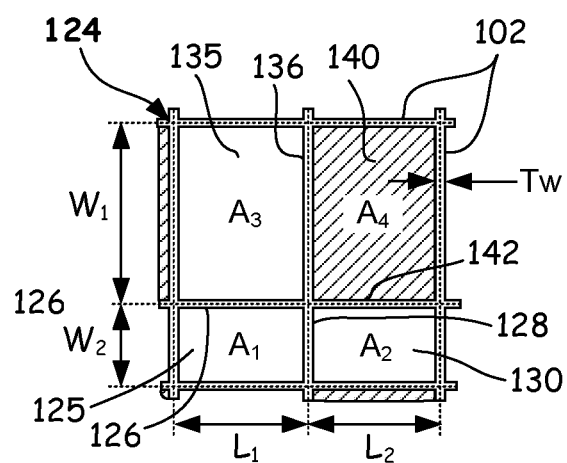
FIG. 1B illustrates an enlarged, partial, inlet-side view of a repeating structural unit of the honeycomb body of FIG. 1A according to one or more embodiments.
Figure 1C:
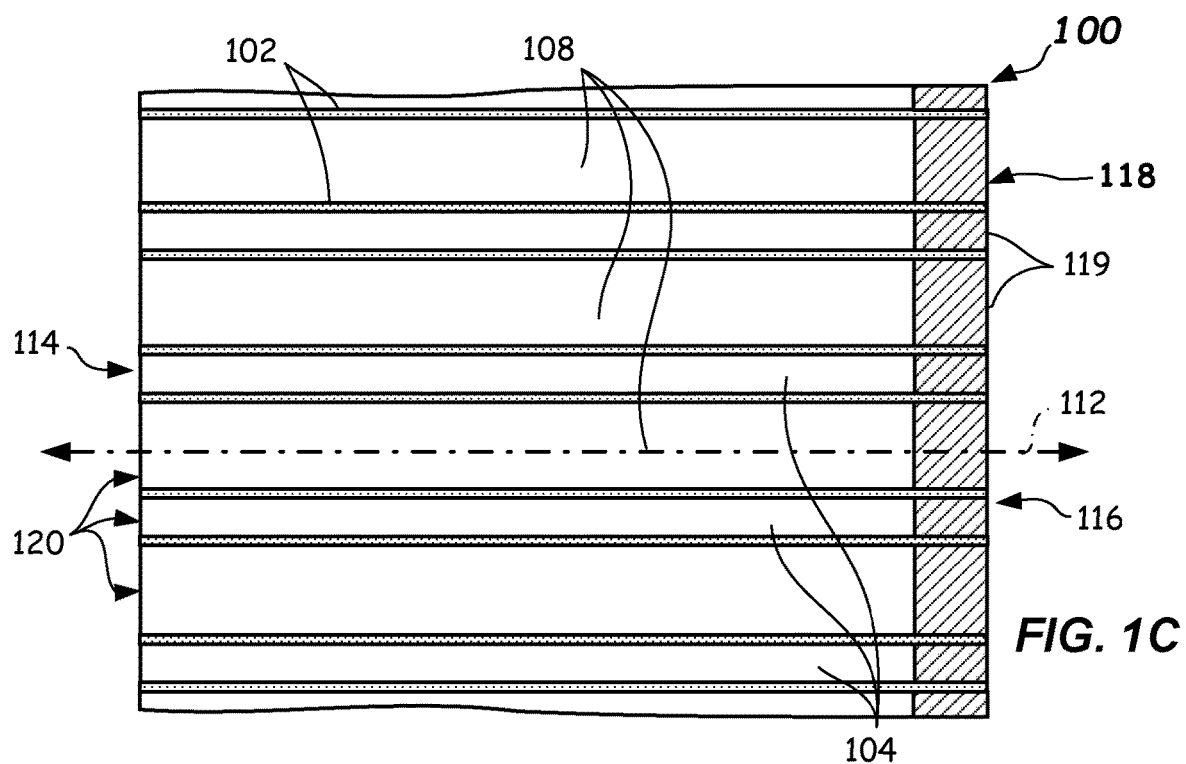
FIG. 1C illustrates a cross-sectioned, partial side view of a honeycomb body taken along section line 1C-1C of FIG. 1A according to one or more embodiments.
Figure 1D:
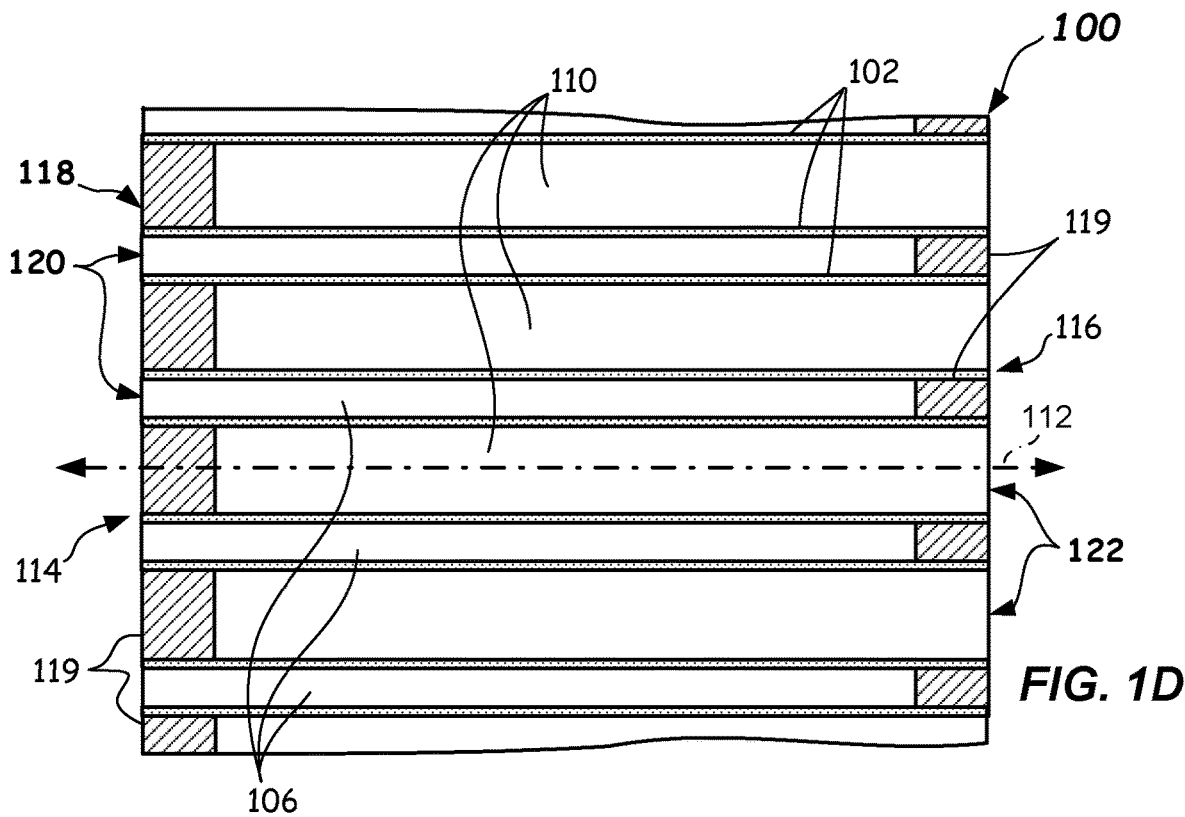
FIG. 1D illustrates a cross-sectioned, partial side view of a honeycomb body taken along section line 1D-1D of FIG. 1A according to one or more embodiments.
Figure 1E:
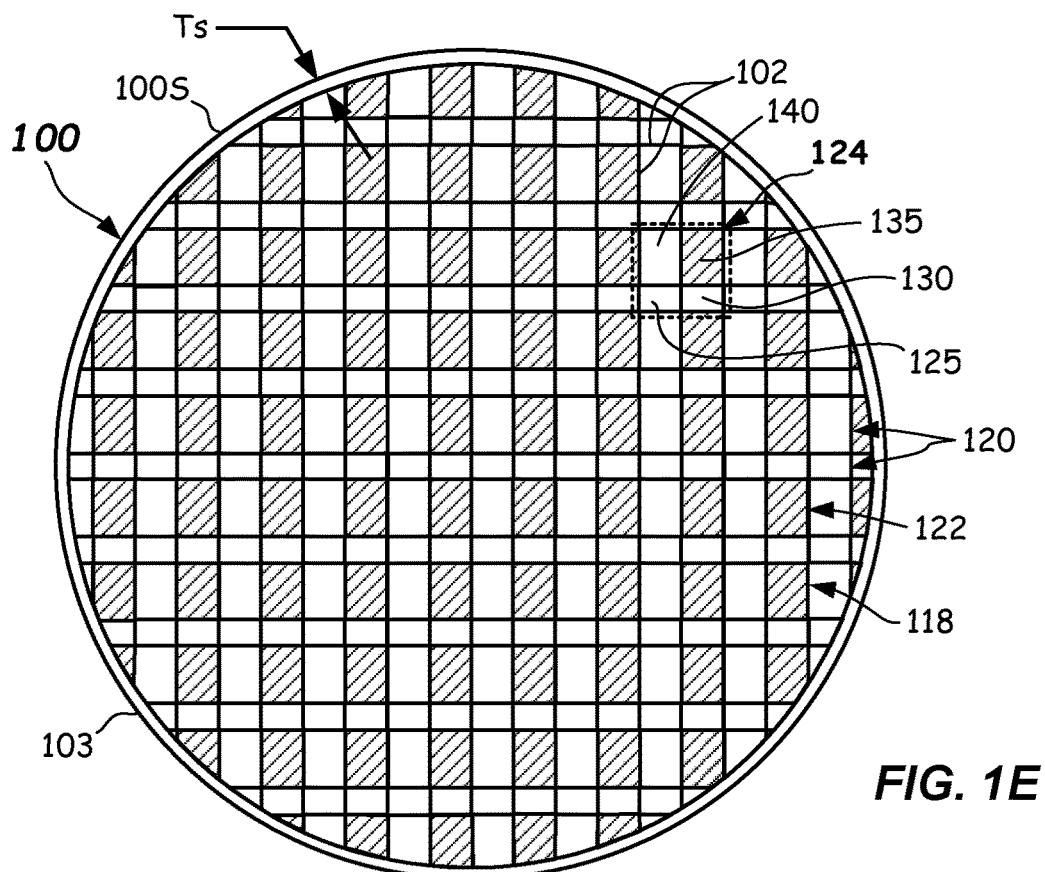
FIG. 1E illustrates an inlet-side end view of a honeycomb body according to one or more embodiments.
Figure 1F:
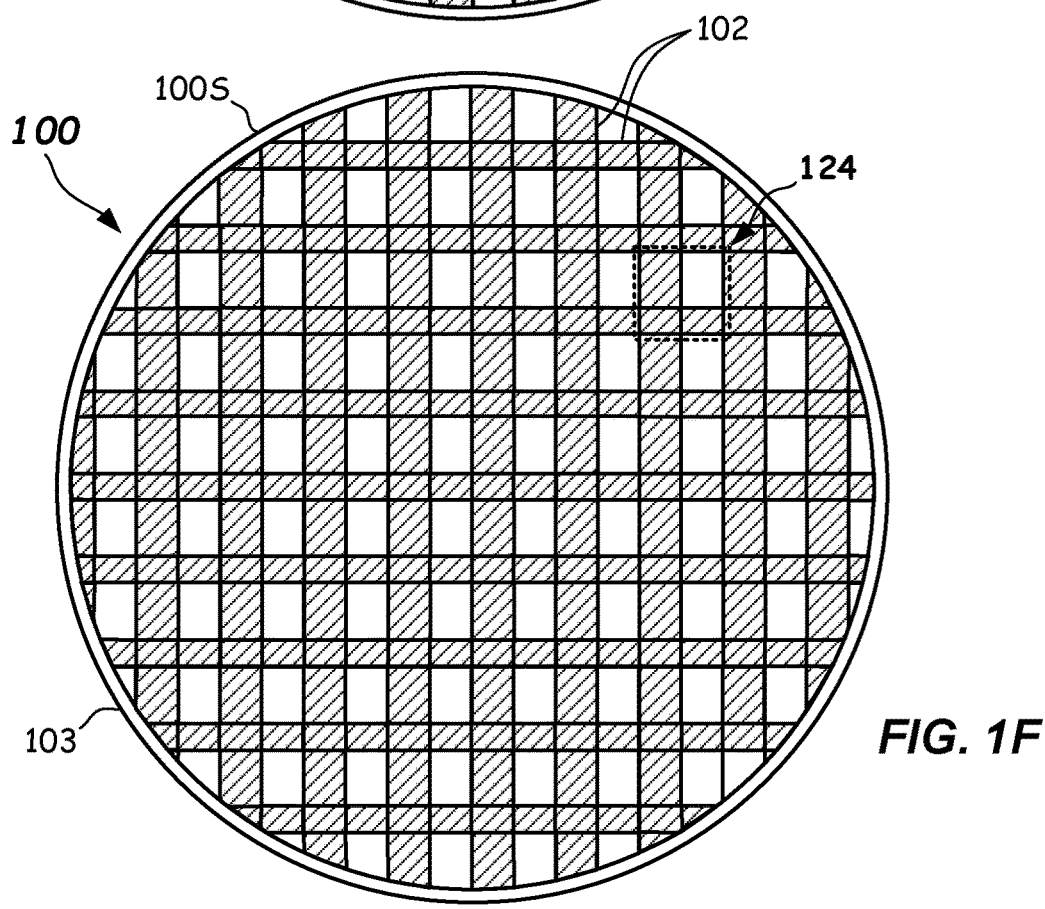
FIG. 1F illustrates an outlet-side end view of a honeycomb body according to one or more embodiments.

Referring now to FIGS. 1A-1B and FIGS. 1E-1F, a honeycomb body 100 comprising a repeating structural unit 124 that is repeated throughout the honeycomb body 100 is shown. Repeating structural unit 124 as used herein means a collection of three of the inlet channels 120 and a single one of the outlet channels 122 that is arranged in a specific pattern that is repeated over and over to form at least some of the structure of the honeycomb body 100. As shown in this embodiment, each repeating structural unit 124, as viewed from the inlet face 114, consists of one of the outlet channels 122 and three of the inlet channels 120, and has a quadrilateral outer perimeter shape (e.g., the outer shape of the repeating structural unit 124 is rectangular). The repeating structural unit 124 comprises the configuration as is shown in FIG. 1B, as well as its mirror image.

In some embodiments, each repeating structural unit 124 is provided in a direct abutting relationship with other adjacent repeating structural units 124' (one labeled in FIG. 1A) that are substantially identical to the repeating structural unit 124. In some regions of the inlet face 114, the repeating structural unit 124 may be entirely surrounded and abutted by other adjacent repeating structural units 124' that are substantially identical to the repeating structural unit 124. As depicted in FIG. 1A, each side of the repeating structural unit 124 may be directly abutted by an adjacent repeating structural unit 124'. Some of the repeating structural units 124 near the skin 103 may be adjacent to one or more incomplete repeating structural units (including less than all the structure of a repeating structural unit 124). As will be apparent, in other embodiments, other configurations of cells and channels and other types of repeating structural units may be present in the honeycomb body along with the repeating structural units 124.

In one or more embodiments, the repeating structural unit 124 is made up of a first channel 125, a second channel 130, a third channel 135, and a fourth channel 140 that are arranged in a defined pattern, wherein each one of the channels 125-140 may be provided in a directly abutting relationship with each of the other channels of the repeating structural unit 124 either at the sides or at a corner (e.g., diagonally) thereof. Referring now to FIG. 1B, the channels 125-140 of the repeating structural unit 124 may be rectangular in transverse cross-section. In the depicted embodiment, the outlet channel 122 is rectangular in transverse cross-sectional shape (e.g., the fourth channel 140). The other channels 125-135 are inlet channels 120 and may also be rectangular in transverse cross-sectional shape. Other embodiments described herein may comprise one or more combinations of rectangular and square channels in transverse cross-sectional shape.

Thus it should be understood that in some embodiments, each of the channels 125-140 in the repeating structural unit 124 is rectangular. In other embodiments, the first channel 125 and the second channel 130 in the repeating structural unit are rectangular. In other embodiments, the first channel 125 and the second channel 130 in the repeating structural unit 124 are square. In some embodiments, the third channel 135 and the fourth channel 140 in the repeating structural unit 124 are rectangular. Each of the channels 125-140 of the embodiments described herein may comprise slight radii or a chamfer or bevel at one or more of the corners of the channels thereof.

Referring to FIG. 1B, the repeating structural unit 124 comprises the area of the four channels 125-140 and comprises half of the transverse wall thickness Tw of the porous walls 102 surrounding the outer perimeter of the cluster of channels 125-140. In other words, the repeating structural unit 124 is equal to $(L_1+L_2+2Tw)\times(W_1+W_2+2Tw)$.

The repeating structural unit 124 has an outer perimeter shape that is a quadrilateral (e.g., rectangular or square) in transverse cross-section. The repeating structural unit 124 comprises the first channel 125, which may be formed from the first cell 104, and comprises, in transverse cross-section, a length $L_1$, a width $W_2$, and a cross-sectional area $A_1$. The first channel 125 comprises a first sidewall 126 and a second sidewall 128 that may be orthogonal to the first sidewall 126. In the depicted embodiment, the first channel 125 comprises an inlet channel 120 and comprises a rectangular cross-sectional shape in transverse cross-section, wherein $L_1>W_2$. However, as will be apparent, the first channel 125 may have a square cross-sectional shape in some embodiments (See FIG. 5 where $W_2=L_1$), or even a rectangular cross-section wherein $W_2=L_1$, or even $L_1>W_2$.

The second channel 130 of the repeating structural unit 124 may be formed from the second cell 106 and comprises, in transverse cross-section, a length $L_2$, the width $W_2$, and a second cross-sectional area $A_2$. The second channel 130 shares the second sidewall 128 with the first channel 125. In the depicted embodiment, the second channel 130 may comprise an inlet channel 120 and comprises a rectangular cross-sectional shape in transverse cross-section, wherein $L_2>W_2$ and $L_1=L_2$ and $A_1=A_2$. However, in some embodiments, the second channel 130 may have a square cross-sectional shape wherein $W_2=L_2$ or even a rectangular cross-section wherein $W_2>L_2$, or even $L_2>W_2$.

The third channel 135 of the repeating structural unit 124 may be formed from the third cell 108 comprising, in transverse cross-section, the length $L_1$, a width $W_1$, and a cross-sectional area $A_3$. The third channel 135 comprises a third sidewall 136 and shares the first sidewall 126 with the first channel 125. In the depicted embodiment, the third channel 135 comprises an inlet channel 120 and may comprise a rectangular cross-sectional shape in transverse cross-section, wherein $W_1>L_1$.

The fourth channel 140 of the repeating structural unit 124 may be formed from the fourth cell 110 and comprises, in transverse cross-section, the length $L_2$, the width $W_1$, and a cross-sectional area $A_4$. The fourth channel 140 shares a fourth sidewall 142 with the second channel 130 and the third sidewall 136 with the third channel 135. In the depicted embodiment, the fourth channel 140 comprises an outlet channel 122 and comprises a rectangular cross-sectional shape in transverse cross-section, wherein $W_1>L_2$ and $A_4=A_3$. However, in some embodiments, $L_2>L_1$ and $A_4>A_3$. Optionally, in some embodiments, $L_2<L_1$ and $A_4<A_3$. The structural and micro structural attributes of the repeating structural unit 124 will be described in more detail below.

Figure 1G:
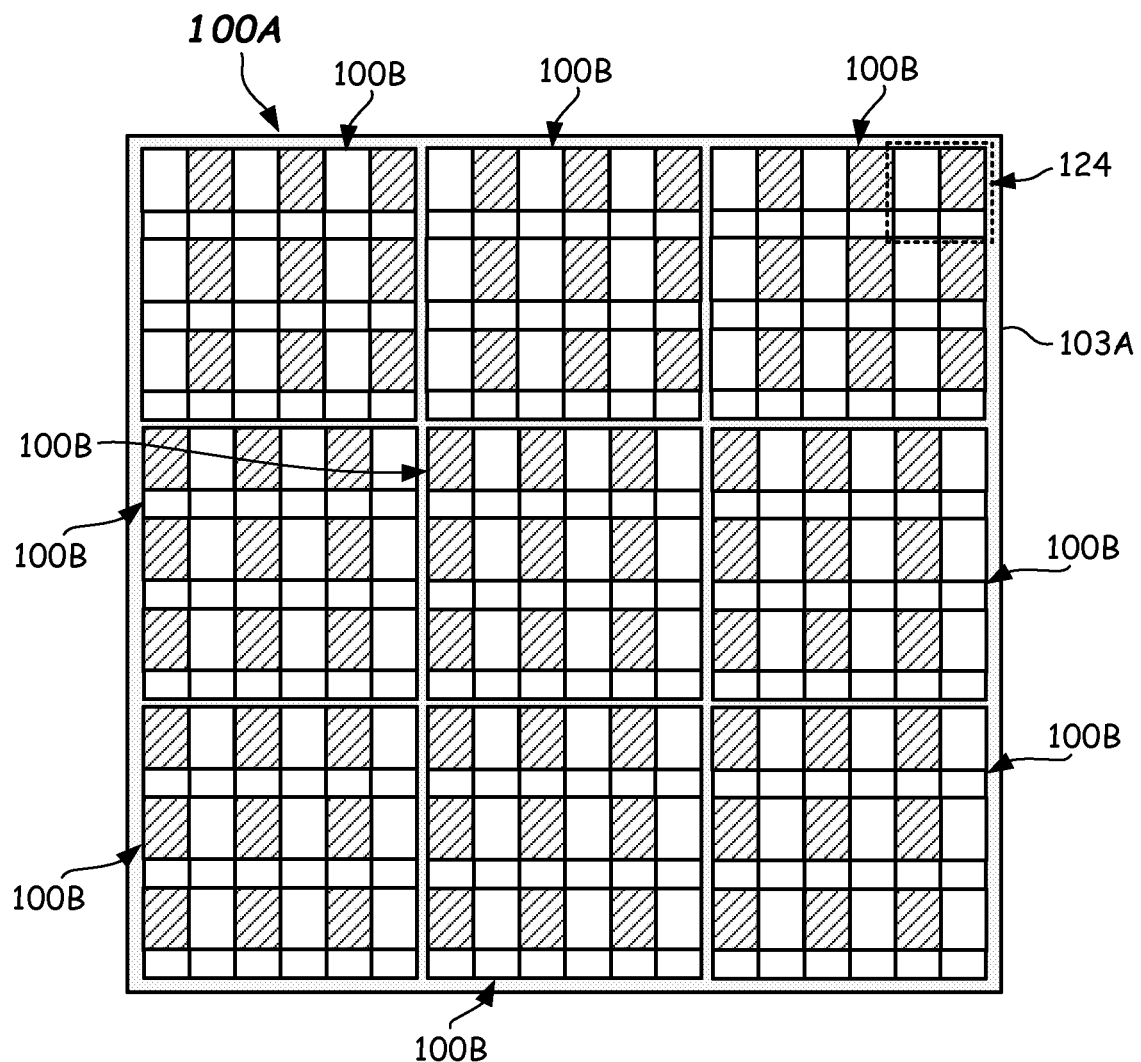
FIG. 1G illustrates an inlet-side end view of a honeycomb assembly comprising multiple assembled honeycomb bodies according to one or more embodiments.

In some embodiments disclosed herein, a honeycomb assembly 100A may be produced by adhering together multiple ones of honeycomb bodies 100B (e.g., having a square or rectangular outer perimeter) for example as is shown in FIG. 1G. Each of the honeycomb bodies 100B may comprise multiple ones of the repeating structural unit 124, as described herein, repeated within the honeycomb bodies 100B. A suitable cement mixture may be used for adhering together the multiple sections of honeycomb bodies 100B. For example, a cement mixture such as is described in WO 2009/017642 may be used. The outer shape of the honeycomb assembly 100A shown in FIG. 1G is square. However, other outer peripheral shapes may be used, such as rectangular, circular, elliptical, oval, race track, and the like. A skin 103A may be applied around the outer periphery of the honeycomb assembly 100A.

Figure 4A:
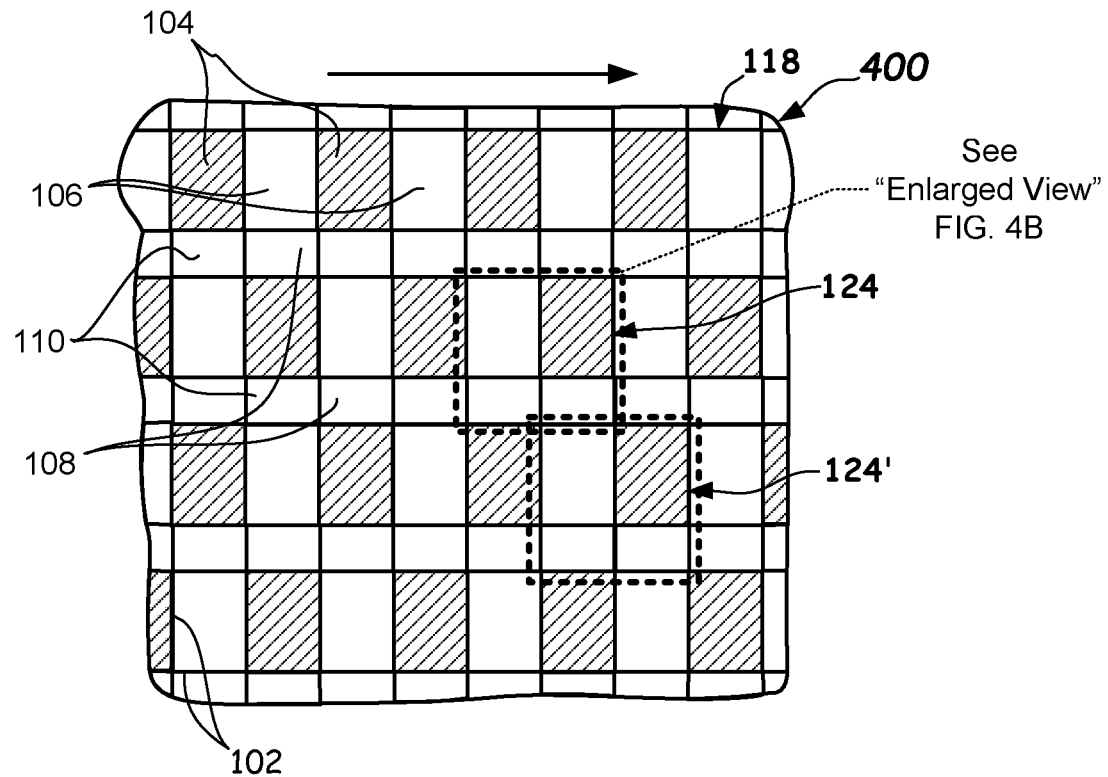
FIG. 4A illustrates a partial end view of an inlet side of another honeycomb body comprising a staggered unit cell configuration according to one or more embodiments.
Figure 4B:
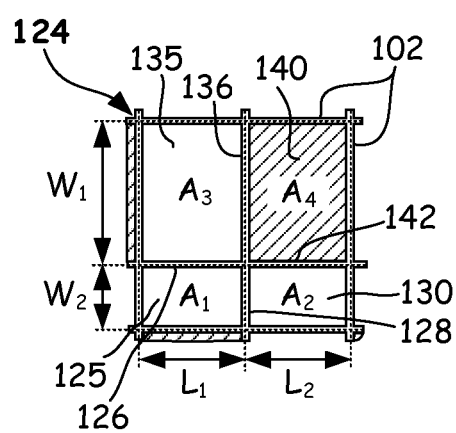
FIG. 4B illustrates an enlarged end view of a repeating structural unit of the honeycomb body of FIG. 4A according to one or more embodiments.

FIGS. 4A-4B illustrate another embodiment of honeycomb body 400 that comprises the same repeating structural unit 124 as described with reference to FIGS. 1A-1F, i.e., that is repeated throughout at least a portion of the honeycomb body 400, but the repeating structural unit 124 is oriented in a staggered configuration relative to some adjacent repeating structural units 124' abutting therewith. For example, the pattern of repeating structural units comprises repeating structural units 124 disposed in a staggered configuration wherein the first channels 125 share a side wall with the fourth channels 140. In particular, the repeating structural unit 124 is staggered so that no outlet channel (e.g., fourth channel 140) of a directly-adjacent repeating structural unit 124' is included in a same vertical column of outlet channels (vertical is as shown with the long dimensions of the third and fourth channels 135, 140 aligned vertically). For example, as shown in FIG. 4A, a directly adjacent repeating structural unit 124' is shown offset one column to the right from the repeating structural unit 124. This staggered configuration of the repeating structural unit 124 has been unexpectedly found to provide performance benefits in terms of even lower pressure drop and improved filtration efficiency, and may have increased strength as compared to the stacked configuration. In this staggered configuration, two sides (e.g., left and right sides as depicted) of the repeating structural unit 124 may be abutted directly by one adjacent repeating structural unit 124' all along the height thereof (e.g., the left and right sides as shown) and the other two sides (e.g., top and bottom sides, as shown) of the repeating structural unit 124 may each be abutted directly by portions of two adjacent repeating structural unit 124' (e.g., two adjacent repeating structural units 124' above and two below).

Figure 5:
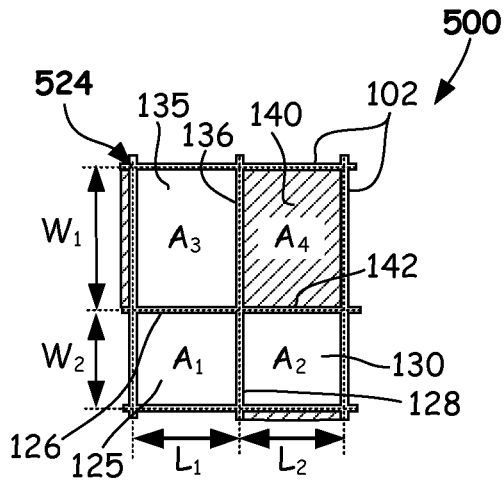
FIG. 5 illustrates an enlarged view of a repeating structural unit of another honeycomb body wherein $W_2=L_1=L_2$ according to one or more embodiments.
Figure 6:
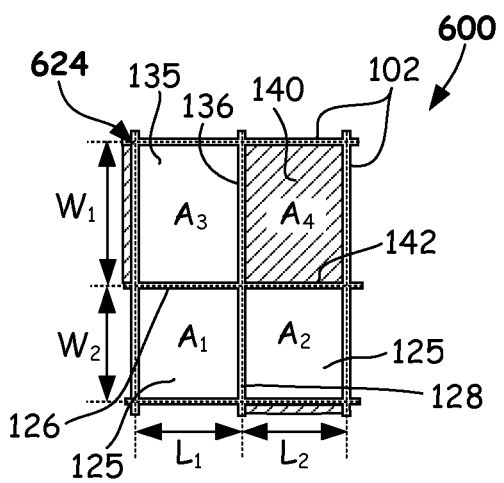
FIG. 6 illustrates an enlarged end view of a repeating structural unit of another honeycomb body wherein $W_2>L_1$ and $W_2>L_2$ and $L_1=L_2$ according to one or more embodiments.
Figure 7:
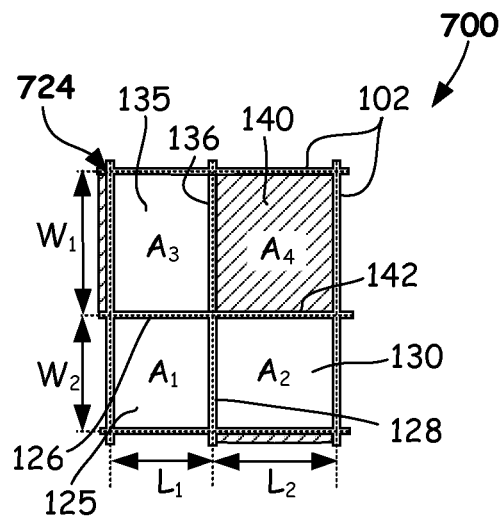
FIG. 7 illustrates an enlarged view of a repeating structural unit of yet another honeycomb body wherein $W_1>W_2$ and $L_1\neq L_2$, according to one or more embodiments.

FIGS. 5-7 illustrate additional embodiments, wherein only the repeating structural unit 524, 624, 724 of each embodiment is shown. The repeating structural units 524, 624 may be repeated within the honeycomb structure in either a stacked orientation as shown in FIG. 1A, or in a staggered orientation as is shown in FIG. 4A. The embodiment of FIG. 7 may be provided in a stacked configuration. In the stacked configuration, the pattern of repeating structural units comprises repeating structural units 124 disposed in a stacked configuration wherein the first channel 125 does not share a side wall with a fourth channel 140. The honeycomb body 500, 600, 700 comprising each of the repeating structural units 524, 624, 724, respectively, is made up of repeating structural units that may abut directly with adjacent repeating structural units that are identical to the repeating structural units 524, 624, 724. Directly abutting as used herein means that there are no intervening channels. The honeycomb bodies 500, 600, 700 in some embodiments are made up of only the repeating structural units 524, 624, 724 together with incomplete repeating structural units adjacent to a skin of the honeycomb bodies 500, 600, 700. In other embodiments, honeycomb bodies 500, 600, 700 may be made up of some of the repeating structural units 524, 624, or 724 in combination with other types of repeating structural units or channels.

Referring now to FIG. 5, the repeating structural unit 524 of the honeycomb body 500 comprises a first channel 125 and a second channel 130 that are inlet channels and comprise a same first shape, which is square in transverse cross-sectional shape. The third channel 135 and the fourth channel 140 each comprise a second shape, which is rectangular in transverse cross-sectional shape. The fourth channel 140 is an outlet channel, while the other channels 125, 130, 135 are inlet channels. In particular, in this embodiment, $A_4=A_3>A_2=A_1$. Also, in this embodiment, $L_1=L_2=W_2$ and $W_2<W_1$. The repeating structural unit 524 may be arranged in the honeycomb body 500 in either a stacked configuration as shown in FIG. 1A or in a staggered configuration like is shown in FIG. 4A. As will be apparent, the combined shapes and geometrical dimensions of the repeating structural unit 524 provides performance of the honeycomb body 500 that exhibits low clean pressure drop, as well as low pressure drop increase as a function of soot loading, both in the clean state and/or soot or ash-loaded state. Particular structural dimensions and other features and properties of embodiments of the repeating structural unit 524 are described below.

Figure 9A:
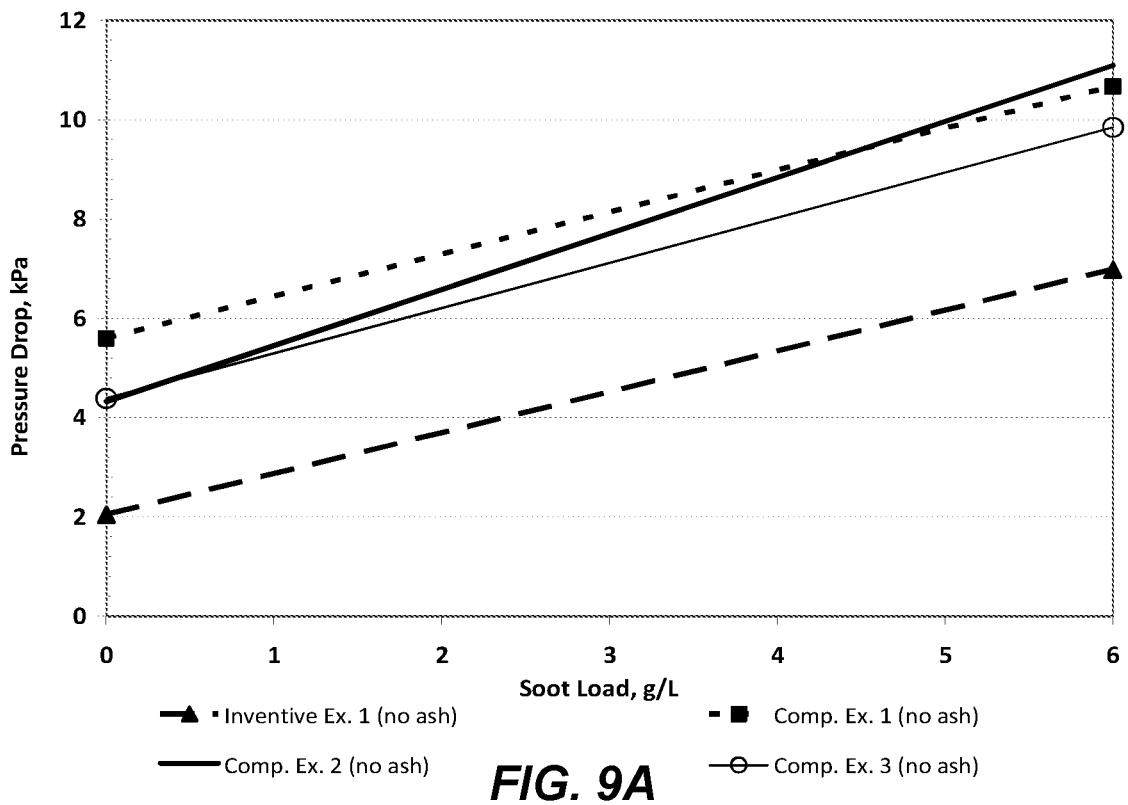
FIGS. 9A-9B illustrate performance plots depicting pressure drop performance of inventive honeycomb bodies versus comparative honeycomb bodies Ex. 1-3 according to one or more embodiments.
Figure 9B:
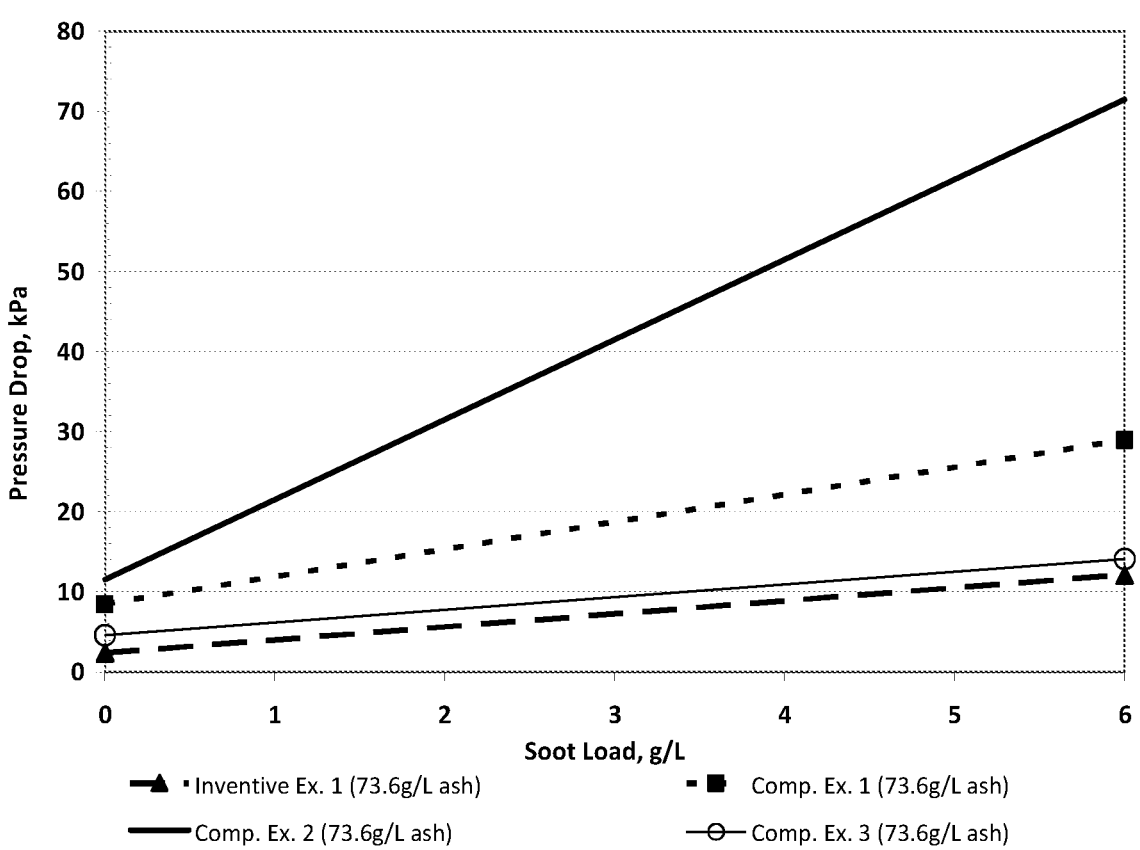

For example, Table 1 below illustrates the performance of several example embodiments (Ex. 1-15, and 20-26) of honeycomb bodies 500 comprising the configuration of repeating structural unit 524 shown in FIG. 5 and which are provided in a staggered configuration (Like FIG. 4A). Furthermore, FIGS. 9A and 9B illustrate pressure drop performance across an example embodiment of a honeycomb body 500 comprising the repeating structural unit 524 in a staggered configuration shown plotted with comparative examples (e.g., Comp. Ex. 1-3).

The pressure drop performance plots of inventive example 1 (Inventive Ex. 1), including no ash, i.e., including various soot loadings (from 0-6 g/L) in FIG. 9A illustrate that the no ash, soot-loaded pressure drop performance of this particular configuration of honeycomb body 500 comprising staggered repeating structural units 524 is substantially better than either of comparative Ex. 1, Ex. 2, or Ex. 3, wherein comparative example 1 (Comp Ex. 1) is an ACT design, comparative example 2 (Comp. Ex. 2) is a standard design with checkerboard plugging, and comparative example 3 (Comp. Ex. 3) is a high inlet number design. Comparative examples 1-3 are disclosed in Table 2 below. Not only is the absolute magnitude of the pressure drop lower for all soot-loaded conditions for inventive Ex. 1, including clean pressure drop, but the rate of change of an increase in pressure drop (i.e., the slope of pressure drop/soot load) as a function of soot loading is also lower.

FIG. 9B illustrates that the soot-loaded pressure drop on an ash-loaded (e.g., 73.6 g/L ash) honeycomb body 500 of the Inventive Ex. 1 comprising the staggered repeating structural unit 524 is also substantially lower than the comparative examples (Comp. Ex. 1-3). Moreover, the slope, i.e., rate of change of the pressure drop is also lower as the soot loading increases from 0 g/L to 6 g/L of soot when compared to at least comparative Ex. 1 and 2.

The configuration and properties of Comp. Ex. 1-3 are shown in Table 2 below. Comparative Ex. 1 has a honeycomb body structure shown and described in FIG. 2 of U.S. Pat. No. 6,696,132, i.e., a channel structure known as asymmetric cell technology (ACT) wherein the inlet channels are larger in area than the outlet channels. Comparative Ex. 2 is a standard honeycomb body structure with inlet channels of the same cross-sectional size and number as the outlet channels, such as in shown in FIG. 1 of U.S. Pat. No. 6,696,132. Comparative Ex. 3 has an increased inlet number channel structure shown and described in FIG. 4 of U.S. Pat. No. 4,417,908, i.e., a honeycomb body structure comprising a repeating structural unit having all square channels and more inlet channels than outlet channels.

Referring now to FIG. 6, another embodiment of honeycomb body 600 is shown. The repeating structural unit 624 is shown in isolation in FIG. 6. However, the repeating structural unit 624 may be arranged in either a stacked or a staggered configuration, as is shown in FIGS. 1A and 4A, within the honeycomb body 600. The repeating structural unit 624 of the honeycomb body 600 comprises a first channel 125 and a second channel 130 that are both inlets and are rectangular, in cross-sectional shape in transverse cross-section. The third channel 135 and the fourth channel 140 are also rectangular in cross-sectional shape in transverse cross-section, and are of the same cross-sectional shape and area. The fourth channel 140 is an outlet channel, wherein the first channel 125, second channel 130, and third channel 135 are inlet channels.

In particular, in some embodiments of FIG. 6, $A_4=A_3>A_2=A_1$. Also, in such embodiments, $L_1=L_2$, $W_1>W_2$, $W_2>L_1$, and $W_2>L_2$. As will be apparent, these combined shapes and dimensions of the repeating structural unit 624 also provides performance of the honeycomb body 600 that exhibits excellent clean pressure drop as well as low pressure drop increase as a function of soot and/or ash loading. Particular structural dimensions and features of the repeating structural unit 624 are described below. In similar embodiments of FIG. 4B, $L_1=L_2$, and $W_1>W_2$, but $W_2<L_1$, and $W_2<L_2$ are provided. In further optional embodiments, the repeating structural unit 624 may comprise $L_1=L_2$ and $W_1=W_2$, but wherein $W_2>L_1$ or $W_z<L_1$. Ex. 29 has all rectangles and $L_1=L_2$ and $W_1=W_2$.

FIG. 7 illustrates another embodiment of honeycomb body 700. The repeating structural unit 724 is also shown in isolation in FIG. 7. In this embodiment, the repeating structural unit 724 may be arranged in either a stacked configuration, as shown in FIG. 1A, within the honeycomb body 700. The repeating structural unit 724 of the honeycomb body 700 comprises a first channel 125 and a second channel 130 that are both rectangular in cross-sectional shape in transverse cross-section. However, in some embodiments, first channel 125 and a second channel 130 may have a square shape in transverse cross-section. The third channel 135 and the fourth channel 140 are rectangular in cross-sectional shape in transverse cross-section. The fourth channel 140 is an outlet channel, wherein the first channel 125, second channel 130, and third channel 135 are inlet channels. In particular, in this embodiment of FIG. 7, $A_4>A_3>A_1>A_2$. Also, in this embodiment, $L_1\ne L_2$, $W_1>W_2$, $W_1>L_2$, $W_2>L_1$, and $W_2>L_2$. As will be apparent, the combined shapes and dimensions of the repeating structural unit 724 also provide for improved performance of the honeycomb body 700 such that it exhibits excellent clean pressure drop as well as low pressure drop increase as a function of soot and/or ash loading. Particular dimensions and features of example structures of the repeating structural unit 724 are described below. Optionally, in some embodiments, $L_1\ne L_2$, $W_1>W_2$, $W_1>L_1$, and $W_1>L_2$, but wherein $W_2<L_1$, and $W_2<L_2$.

Each of the embodiments of FIGS. 1A-1F, 4A-4B, and 5-7 may comprise certain microstructural and geometrical structural properties, which in combination with the configuration of the repeating structural unit 124, 524, 624, 724 may provide for a combination of good soot and ash loading capacity and relatively-low pressure drop performance, including relatively-low clean pressure drop as well as relatively-low pressure drop increase as a function of soot and/or ash loading. For example, the open and interconnected porosity (% P) of the porous walls 102, after firing, may be % P≥40%, % P≥45%, % P≥50%, % P≥60%, or even % P≥65% in some embodiments. In some embodiments, the open and interconnected porosity of the intersecting porous walls 102 may be 35%≤% P≤70%, or even 40%≤% P≤60%, or even 45%≤% P≤55%. Other values of % P may be used. Porosity (% P) as recited herein is measured by a mercury porosity measurement method. The honeycomb bodies 100, 400, 500, 600, and 700 of each of the embodiments of FIGS. 1A-1F, 4A-4B, and 5-7 may comprise an inlet open frontal area (inlet OFA) of 38%≤inlet OFA≤62%, or even 44%≤inlet OFA≤55%.

The porous walls 102, after firing, may comprise a transverse wall thickness Tw of Tw≥0.004 inch (0.102 mm), Tw≥0.006 inch (0.150 mm), Tw≥0.008 inch (0.203 mm), or even Tw≥0.010 inch (0.254 mm) in some embodiments. In some embodiments, Tw≤0.014 inch (0.356 mm), Tw≤0.012 inch (0.305 mm), or even Tw≤0.010 inch (0.254 mm). In one or more embodiments, 0.004 inch (0.102 mm)≤Tw≤0.014 inch (0.356 mm), or even 0.006 inch (0.150 mm)≤Tw≤0.010 inch (0.254 mm), for example. Other values of transverse wall thickness Tw may be used.

The porous walls 102, after firing, may comprise a median pore diameter (MPD) of 10 µm≤MPD≤16 µm, or even 11 µm≤MPD≤15 µm in some embodiments. The breadth Db of the pore size distribution of the open, interconnected porosity may be Db≤1.5, or even Db≤1.0, wherein Db=(($D_{90}$−$D_{10}$)/$D_{50}$), wherein $D_{90}$ is an equivalent spherical diameter in the pore size distribution of the porous walls 102 where 90% of the pores have an equal or smaller diameter and 10% have a larger diameter, and $D_{10}$ is an equivalent spherical diameter in the pore size distribution where 10% of the pores have an equal or smaller diameter, and 90% have a larger diameter. The median pore diameter (MPD) and breadth Db of the pore size distribution may be measured by mercury porosimetry, for example.

The cell density (CD) of the honeycomb body, 400, 500, 600, 700 may be may be 10 cells/in² (1.55 cells/cm²)≤CD≤400 cells/in² (62 cells/cm²), or even 50 cells/in² (7.75 cells/cm²)≤CD≤375 cells/in² (58 cells/cm²), or even 225 cells/in² (35 cells/cm²)≤CD≤375 cells/in² (58 cells/cm²), and may be CD≥150 cells/in² (23 cells/cm²), or even CD≥200 cells/in² (31 cells/cm²) in some embodiments. Other cell densities may be used. The above described % P, Tw, Db, MPD, and CD may be combined in any combination with each other and with the repeating structural units described herein.

For each of the embodiments of FIGS. 1A-1F, 4A-4B, and 5-7, the areas $A_1$ through $A_4$ may be sized in accordance with the relationships defined below, wherein in each embodiment, the channels 125-140 comprise quadrilateral shape in cross-section, and the fourth channel 140 is an outlet channel and has a quadrilateral and rectangular cross-sectional shape in transverse cross-section. In other embodiments, the quadrilateral cross-sectional shape in the repeating structural unit 524, 724 may comprise some rectangular channels and some square channels. Furthermore, in each embodiment, the repeating structural unit 124, 524, 624, 724 has a quadrilateral outer perimeter shape, such as a rectangular or even a square outer perimeter shape.

Ratio $A_3/A_1$

The structure of the repeating structural units 124, 524, 624, 724 is selected to provide combinations of good soot carrying capacity, low clean pressure drop, as well as low pressure drop increase as a function of soot and/or ash loading. More particularly, in one or more embodiments, the geometrical structure of the repeating structural unit 124, 524, 624, 724 may comprise $A_4 \geq A_3 \geq A_2 \geq A_1$. Furthermore, the first channel 125 and third channel 135 may be sized so that a ratio of $A_3/A_1$ may be $A_3/A_1 \geq 1.2$, or even $A_3/A_1 \geq 1.5$, or even $A_3/A_1 \geq 2.0$, or even $A_3/A_1 \geq 2.5$, or even $A_3/A_1 \geq 4.0$ in some embodiments. In some embodiments, the ratio of $A_3/A_1$ may even be $A_3/A_1 \leq 10$. In some embodiments, the ratio of $A_3/A_1$ may comprise $A_3/A_1 \leq 4.0$, or even $A_3/A_1 \leq 2.5$. In one or more embodiments, the ratio of $A_3/A_1$ may be $1.2 \leq A_3/A_1 \leq 10$, or even $1.2 \leq A_3/A_1 \leq 4.0$, or even $1.2 \leq A_3/A_1 \leq 2.5$, for example. $A_3$ may be 0.00239 in² (1.54 mm²) ≤$A_3$<0.01990 in (12.8 mm²), and $A_1$ may be 0.00150 in (0.968 mm²)≤$A_1$<0.00398 in (2.57 mm²), for example. In some embodiments, the structure of the repeating structural units 124, 524, 624, 724 comprises $A_3/A_1 \leq 10$ and OFA>38%, or even $A_3/A_1 \leq 10$ and OFA>44%.

Ratio $A_4/A_2$

Similarly, for the disclosed embodiments of FIGS. 1A-1F, 4A-4B, and 5-7, the geometrical structure of the repeating structural units 124, 524, 624, 724 may comprise a ratio of $A_4/A_2 \geq 1.2$, or even $A_4/A_2 \geq 1.5$, or even $A_4/A_2 \geq 2.0$, or even $A_4/A_2 \geq 2.5$, or even $A_4/A_2 \geq 4.0$. In some embodiments, the ratio of $A_4/A_2$ may be $A_4/A_2 \leq 10$. In some embodiments, the ratio of $A_4/A_2$ may be $A_4/A_2 \leq 4.0$, or even $A_4/A_2 \leq 2.5$, for example. In some embodiments, the ratio of $A_4/A_2$ may be $1.2 \leq A_4/A_2 \leq 10$, or even $1.2 \leq A_4/A_2 \leq 4.0$, or even $1.2 \leq A_4/A_2 \leq 2.5$. $A_4$ may be 0.00239 in² (1.54 mm²)≤$A_4$<0.01990 in² (12.8 mm²) and $A_2$ may be 0.00150 in² (0.97 mm²)≤$A_2 \leq 0.01990$ in² (12.8 mm²). for example.

As is shown in the embodiments of FIG. 1A-1F, 4A-4B, and FIGS. 5 and 6, $L_1=L_2$ and $W_1 \neq W_2$. The presence of $L_1=L_2$ in the configurations shown can have an advantage that such extrusion dies are easy to manufacture by virtue of equally-spaced due cuts in one direction that can be made such as by wire EDM or saw cutting entirely across one direction (e.g., along a height direction) of the extrusion die (vertically as shown). Moreover, in the honeycomb body 100, 400, 500, 600, 700, the porous walls 102 may extend from one portion of the skin 103 to another portion of the skin 103 such that all the intersecting porous walls 102 extend continuously in a straight line across the inlet face 114 and outlet face 116. In the other orthogonal direction (e.g., horizontally as shown), non-equally-spaced due cuts can be made, but also such as by wire EDM or saw cutting entirely across a width of the extrusion die in a straight line resulting in horizontal walls of the intersecting porous walls 102 that extend continuously across a width of honeycomb body 100, 400, 500, 600, 700.

Ratio $W_1/W_2$

As is shown in the embodiments of FIGS. 1A-1F, 4A-4B, and FIGS. 5-7, the respective repeating structural units 124-724 may comprise geometrical structure wherein $W_1/W_2 \geq 1.2$, or even $W_1/W_2 \geq 1.5$, or even $W_1/W_2 \geq 2.0$, or even $W_1/W_2 \geq 3.0$, or even $W_1/W_2 \geq 4.0$. In some embodiments, $W_1/W_2 \leq 10$, or even $W_1/W_2 \leq 4.0$, or even $W_1/W_2 \leq 2.5$. In some embodiments, the ratio of $W_1/W_2$ may be $1.2 \leq W_1/W_2 \leq 10$, or even $1.2 \leq W_1/W_2 \leq 4.0$, or even $1.2 \leq W_1/W_2 \leq 2.5$, for example. $W_2$ may be 0.035 inch (0.883 mm)≤$W_2 \leq 0.069$ inch (1.75 mm) and $W_1$ may be 0.048 inch (1.22 mm)≤$W_1$≤0.196 inch (4.98 mm), for example. In some embodiments, 1.2≤$W_1/L_2$≤10 and 1.2≤$W_1/L_2$≤10, or even 1.2≤$W_1/L_2$≤4.0 and 1.2≤$W_1/L_1$≤4.0, or even 1.2≤$W_1/L_2$≤2.5 and 1.2≤$W_1/L_1$≤2.5.

In one particularly effective example comprising the configuration of any of the repeating structural units 124, 524, 624, or 724, the honeycomb structure comprises a wall thickness Tw of the intersecting porous walls 102 of 0.006 inch (0.152 mm)≤Tw≤0.010 inch (0.254 mm), an open porosity (% P) of the intersecting porous walls 102 of 40%≤P %≤60%, a median pore size (MPS) of the porous walls 102 of 10 microns≤MPS≤16 microns, an inlet open frontal area (inlet OFA) of 38%≤inlet OFA≤62%, and the ratio of $W_1/W_2$ is 1.2≤$W_1/W_2$≤2.5. Other geometrical features such as $L_1$=$L_2$, $L_2$>$L_1$, or even $L_2$<$L_1$ may be included.

As is shown in the embodiments of FIGS. 1A-1F, 4A-4B, and FIGS. 5-7, the respective repeating structural units 124-724 may comprise geometrical structure wherein an area fraction of a cross-sectional area of the fourth channel 140 (comprising an outlet cell) divided by a cross-sectional area of all channels 125-140 of the repeating structural units 124-724 may be between 0.27 and 0.46.

In certain embodiments of the repeating structural units 124, 624, such as those shown in FIGS. 1A-1F, FIGS. 4A-4B, and FIG. 6, the first channel 125 and the second channel 130 comprise a same first rectangular shape in transverse cross-section, and the third channel 135 and the fourth channel 140 comprise a same second rectangular shape. Moreover, in these embodiments, the first channel 125, the second channel 130, and the third channel 135 are inlet channels, and the fourth channel 140 is an outlet channel. In particular, in these embodiments the respective areas of the channels may be sized in accordance with the relationship: $A_4$=$A_3$>$A_2$=$A_1$.

In other embodiments of the repeating structural unit 724, such as is shown in FIG. 7, the first channel 125 and the second channel 130 comprise different-sized quadrilateral shapes in transverse cross-section, and the third channel 135 and the fourth channel 140 also comprise different-sized quadrilateral shapes in transverse cross-section. In particular, in one embodiment, all four channels 125-140 may have a rectangular shape in transverse cross-section. Moreover, in these embodiments, the first channel 125, the second channel 130, and third channel 135 are inlet channels, and the fourth channel 140 is an outlet channel. In particular, in some embodiments, the respective areas of the channels may be sized in accordance with the relationship: $A_4$≠$A_3$>$A_2$≠$A_1$. In the FIG. 7 embodiment, $L_2/L_1$≥1.2, or even $L_2/L_1$≥1.5, or even $L_2/L_1$≥2.0, or even $L_2/L_1$≥2.5 or even $L_2/L_1$≥4.0. In some embodiments, $L_2/L_1$≤10, $L_2/L_1$≤4.0, or even $L_2/L_1$≤2.5. In some of the FIG. 7 embodiments, $L_2/L_1$ may be 1.2≤$L_2/L_1$≤10, or even 1.2≤$L_2/L_1$≤4.0, or even 1.2≤$L_2/L_1$≤2.5.

Referring now to FIG. 5, a particularly effective embodiment of the repeating structural unit 524 of a honeycomb body 500 is shown. In the depicted embodiment, the repeating structural unit 524 of the honeycomb body 500 comprises a first channel 125, a second channel 130, a third channel 135, and a fourth channel 140 as previously described, but wherein the respective areas of the channels may be sized in accordance with the relationship: $A_4$=$A_3$>$A_1$=$A_2$. Furthermore, the first channel 125 and the second channel 130 comprise a same first square shape in transverse cross-section and are inlet channels, the third channel 135 is an inlet channel, and the fourth channel 140 is an outlet channel, and the third channel 135 and the fourth channel 140 comprise a same second rectangular shape in transverse cross-section.

In particular, for the embodiment of FIG. 5, the repeating structural unit 524 may comprise a geometrical structure wherein $L_1$=$L_2$ and $W_1$≠$W_2$. The third channel 135 and the fourth channel 14 each comprises a rectangular shape wherein $W_1$>$L_1$ and $W_1$>$L_2$. In particular, for this embodiment, $W_1$>$W_2$. For this embodiment, a ratio of $A_3/A_1$ may be $A_3/A_1$≥1.2, or even $A_3/A_1$≥1.5, or even $A_3/A_1$≥2.0, or even $A_3/A_1$≥2.5, or even $A_3/A_1$≥4.0. For this embodiment, a ratio of $A_3/A_1$ may be $A_3/A_1$≤10, or even $A_3/A_1$≤4.0, and in some embodiments may be $A_3/A_1$≤2.5. For this embodiment, $A_3/A_1$ may be 1.2≤$A_3/A_1$≤10, or even 1.2≤$A_3/A_1$≤4.0, or even between 1.2≤$A_3/A_1$≤2.5 in some embodiments.

Examples

Examples of honeycomb bodies 400, 500, 600, and 700 comprising the honeycomb structure shown in the FIGS. 4A-7 embodiments are provided in Table 1 below. $A_1$ through $A_3$ are the transverse cross-sectional areas of the respective inlet channels, whereas $A_4$ is the transverse cross-sectional area of the rectangular outlet channel. Additionally, estimated performance based upon modeling for the various embodiments, including comparisons to comparative examples 1-3 (Comp. Ex. 1-3) are shown below in Table 1. In particular, percentage improvements (% IMP) in pressure drop (ΔP) performance under various conditions in comparison to various comparative examples (Comp. Ex. 1-3) are provided.

TABLE 1

| Inventive honeycomb body examples (Ex. 1 through Ex. 5) | | | | | |
|---|---|---|---|---|---|
| | Inventive Example No. | | | | |
| | Ex. 1 | Ex. 2 | Ex. 3 | Ex. 4 | Ex. 5 |
| L1, inches | 0.0446 | 0.0446 | 0.0446 | 0.0446 | 0.0446 |
| L2, inches | 0.0446 | 0.0446 | 0.0446 | 0.0446 | 0.0446 |
| W1, inches | 0.0892 | 0.1338 | 0.1115 | 0.0781 | 0.0669 |
| W2, inches | 0.0446 | 0.0446 | 0.0446 | 0.0446 | 0.0446 |
| L2/L1, inch/inch | 1 | 1 | 1 | 1 | 1 |
| W2/L1, inch/inch | 1 | 1 | 1 | 1 | 1 |
| L1/L2, inch/inch | 1 | 1 | 1 | 1 | 1 |
| W1/W2, inch/inch | 2 | 3 | 2.5 | 1.75 | 1.5 |
| W1/L1, inch/inch | 2 | 3 | 2.5 | 1.75 | 1.5 |
| W1/L2, inch/inch | 2 | 3 | 2.5 | 1.75 | 1.5 |
| Wall thickness (Tw), mils | 8.1 | 8.1 | 8.1 | 8.1 | 8.1 |
| A1 area, inches$^2$ | 0.00199 | 0.00199 | 0.00199 | 0.00199 | 0.00199 |
| A2 area, inches$^2$ | 0.00199 | 0.00199 | 0.00199 | 0.00199 | 0.00199 |

TABLE 1-continued

| | | | | | |
|---|---|---|---|---|---|
| A3 area, inches$^2$ | 0.00398 | 0.00597 | 0.00497 | 0.00348 | 0.00298 |
| A4 area, inches$^2$ | 0.00398 | 0.00597 | 0.00497 | 0.00348 | 0.00298 |
| A4/A2, inches$^2$/inches$^2$ | 2 | 3 | 2.5 | 1.75 | 1.5 |
| A3/A1, inches$^2$/inches$^2$ | 2 | 3 | 2.5 | 1.75 | 1.5 |
| F1 (area fraction of A1)/all cells | 0.167 | 0.125 | 0.143 | 0.182 | 0.200 |
| F2 (area fraction of A2)/all cells | 0.167 | 0.125 | 0.143 | 0.182 | 0.200 |
| F3 (area fraction of A3)/all cells | 0.333 | 0.375 | 0.357 | 0.318 | 0.300 |
| F4 (area fraction of A4)/all cells | 0.333 | 0.375 | 0.357 | 0.318 | 0.300 |
| Open area fraction of all cells open | 0.75 | 0.78 | 0.77 | 0.75 | 0.74 |
| Repeating Structural Unit Area, inches$^2$ | 0.0158 | 0.0205 | 0.0182 | 0.0146 | 0.0135 |
| Inlet OFA, % | 50.3 | 48.5 | 49.3 | 51.0 | 51.7 |
| Inlet/outlet area ratio | 2.00 | 1.67 | 1.80 | 2.14 | 2.33 |
| Cells per inch$^2$ | 253 | 195 | 220 | 273 | 297 |
| Wall porosity, % | 45 | 45 | 45 | 45 | 45 |
| Median Pore Size (MPS), microns | 14.5 | 14.5 | 14.5 | 14.5 | 14.5 |
| Filter size, length, inches | 7.5 | 7.5 | 7.5 | 7.5 | 7.5 |
| Filter size, diameter, inches | 13 | 13 | 13 | 13 | 13 |
| Gas mass flow rate, Kg/hr | 1700 | 1700 | 1700 | 1700 | 1700 |
| Gas temperature, degrees C. | 380 | 380 | 380 | 380 | 380 |
| Clean ΔP, KPa [ash = 0 g/L, soot = 0 g/L] | 2.04 | 1.72 | 1.96 | 2.39 | 2.96 |
| Soot-loaded ΔP, KPa [ash = 0 g/L, soot = 6 g/L] | 6.98 | 6.46 | 6.8 | 7.37 | 7.91 |
| Ash-loaded ΔP, KPa [ash = 73.6 g/L, soot = 0 g/L] | 2.34 | 2.33 | 2.29 | 2.68 | 3.18 |
| Ash & Soot-loaded ΔP, KPa [ash = 73.6 g/L, soot = 6 g/L] | 12.1 | 12.05 | 12.15 | 12.3 | 12.66 |
| % IMP in ΔP vs. Comp. Ex. 1 [ash = 0 g/L, soot = 0 g/L] | 63.5 | 69.2 | 64.9 | 57.2 | 47.0 |
| % IMP in ΔP vs. Comp. Ex. 1 [ash = 0 g/L, soot = 6 g/L] | 34.6 | 39.5 | 36.3 | 30.9 | 25.9 |
| % IMP in ΔP vs. Comp. Ex. 1 [ash = 73.6 g/L, soot = 0 g/L] | 72.3 | 72.4 | 72.9 | 68.3 | 62.4 |
| % IMP in P vs. Comp. Ex. 1 [ash = 73.6 g/L, soot = 6 g/L] | 58.2 | 58.4 | 58.0 | 57.5 | 56.3 |
| % IMP in ΔP vs. Comp. Ex. 2 [ash = 0 g/L, soot = 0 g/L] | 52.8 | 60.2 | 54.6 | 44.7 | 31.5 |
| % IMP in ΔP vs. Comp. Ex. 2 [ash = 0 g/L, soot = 6 g/L] | 37.1 | 41.7 | 38.7 | 33.5 | 28.7 |
| % IMP in ΔP vs. Comp. Ex. 2 [ash = 73.6 g/L, soot = 0 g/L] | 79.7 | 79.8 | 80.2 | 76.8 | 72.4 |
| % IMP in ΔP vs. Comp. Ex. 2 [ash = 73.6 g/L, soot = 6 g/L] | 83.1 | 83.1 | 83.0 | 82.8 | 82.3 |
| % IMP in ΔP vs. Comp. Ex. 3 [ash = 0 g/L, soot = 0 g/L] | 53.4 | 60.7 | 55.3 | 45.4 | 32.4 |
| % IMP in ΔP vs. Comp. Ex. 3 [ash = 0 g/L, soot = 6 g/L] | 29.1 | 34.3 | 30.9 | 25.1 | 19.6 |
| % IMP in ΔP vs. Comp. Ex. 3 [ash = 73.6 g/L, soot = 0 g/L] | 48.7 | 48.9 | 49.8 | 41.2 | 30.3 |
| % IMP in ΔP vs. Comp. Ex. 3 [ash = 73.6 g/L, soot = 6 g/L] | 14.0 | 14.4 | 13.6 | 12.6 | 10.0 |

(Ex. 6 through Ex. 10)

| | Inventive Example No. | | | | |
|---|---|---|---|---|---|
| | Ex. 6 | Ex. 7 | Ex. 8 | Ex. 9 | Ex. 10 |
| L1, inches | 0.0446 | 0.0446 | 0.0551 | 0.0626 | 0.0446 |
| L2, inches | 0.0446 | 0.0446 | 0.0551 | 0.0626 | 0.0446 |
| W1, inches | 0.1784 | 0.4460 | 0.1103 | 0.1252 | 0.0892 |
| W2, inches | 0.0446 | 0.0446 | 0.0551 | 0.0626 | 0.0446 |
| L2/L1, inch/inch | 1 | 1 | 1 | 1 | 1 |
| W2/L1, inch/inch | 1 | 1 | 1 | 1 | 1 |
| L1/L2, inch/inch | 1 | 1 | 1 | 1 | 1 |
| W1/W2, inch/inch | 4 | 10 | 2 | 2 | 2 |
| W1/L1, inch/inch | 4 | 10 | 2 | 2 | 2 |
| W1/L2, inch/inch | 4 | 10 | 2 | 2 | 2 |
| Wall thickness (Tw), mils | 8.1 | 8.1 | 8.1 | 8.1 | 8.1 |
| A1 area, inches$^2$ | 0.00199 | 0.00199 | 0.00304 | 0.00392 | 0.00199 |
| A2 area, inches$^2$ | 0.00199 | 0.00199 | 0.00304 | 0.00392 | 0.00199 |
| A3 area, inches$^2$ | 0.00796 | 0.01990 | 0.00608 | 0.00784 | 0.00398 |
| A4 area, inches$^2$ | 0.00796 | 0.01990 | 0.00608 | 0.00784 | 0.00398 |
| A4/A2, inches$^2$/inches$^2$ | 4 | 10 | 2 | 2 | 2 |
| A3/A1, inches$^2$/inches$^2$ | 4 | 10 | 2 | 2 | 2 |
| F1 (area fraction of A1)/all cells | 0.100 | 0.045 | 0.167 | 0.167 | 0.167 |
| F2 (area fraction of A2)/all cells | 0.100 | 0.045 | 0.167 | 0.167 | 0.167 |
| F3 (area fraction of A3)/all cells | 0.400 | 0.455 | 0.333 | 0.333 | 0.333 |
| F4 (area fraction of A4)/all cells | 0.400 | 0.455 | 0.333 | 0.333 | 0.333 |

TABLE 1-continued

| | | | | | |
|---|---|---|---|---|---|
| Open area fraction of all cells open | 0.79 | 0.82 | 0.79 | 0.82 | 0.75 |
| Repeating Structural Unit area, inches² | 0.0252 | 0.0534 | 0.0230 | 0.0289 | 0.0158 |
| Inlet OFA, % | 47.3 | 44.7 | 52.9 | 54.3 | 50.3 |
| Inlet/outlet area ratio | 1.50 | 1.20 | 2.00 | 2.00 | 2.00 |
| Cells per inch² | 159 | 75 | 174 | 139 | 253 |
| Wall porosity, % | 45 | 45 | 45 | 45 | 55 |
| Median Pore Size, microns | 14.5 | 14.5 | 14.5 | 14.5 | 14.5 |
| Filter size, length, inches | 7.5 | 7.5 | 7.5 | 7.5 | 7.5 |
| Filter size, diameter, inches | 13 | 13 | 13 | 13 | 13 |
| Gas mass flow rate, Kg/hr | 1700 | 1700 | 1700 | 1700 | 1700 |
| Gas temperature, degrees C. | 380 | 380 | 380 | 380 | 380 |
| Clean ΔP, KPa [ash = 0 g/L, soot = 0 g/L] | 1.47 | 1.19 | 1.6 | 1.44 | 1.97 |
| Soot-loaded ΔP, KPa [ash = 0 g/L, soot = 6 g/L] | 6.03 | 5.25 | 8.4 | 9.64 | 6.8 |
| Ash-loaded ΔP, KPa [ash = 73.6 g/L, soot = 0 g/L] | 1.7 | 1.43 | 1.85 | 1.71 | 2.16 |
| Ash & soot-loaded ΔP, KPa [ash = 73.6 g/L, soot = 6 g/L] | 11.75 | 11.39 | 14.7 | 16.97 | 11.85 |
| % IMP in ΔP vs. Comp. Ex. 1 [ash = 0 g/L, soot = 0 g/L] | 73.7 | 78.7 | 71.4 | 74.2 | 64.8 |
| % IMP in ΔP vs. Comp. Ex. 1 [ash = 0 g/L, soot = 6 g/L] | 43.5 | 50.8 | 21.3 | 9.7 | 36.3 |
| % IMP in ΔP vs. Comp. Ex. 1 [ash = 73.6 g/L, soot = 0 g/L] | 79.9 | 83.1 | 78.1 | 79.8 | 74.4 |
| % IMP in ΔP vs. Comp. Ex. 1 [ash = 73.6 g/L, soot = 6 g/L] | 59.4 | 60.6 | 49.2 | 41.4 | 59.1 |
| % IMP in ΔP vs. Comp. Ex. 2 [ash = 0 g/L, soot = 0 g/L] | 66.0 | 72.5 | 63.0 | 66.7 | 54.4 |
| % IMP in ΔP vs. Comp. Ex. 2 [ash = 0 g/L, soot = 6 g/L] | 45.6 | 52.7 | 24.3 | 13.1 | 38.7 |
| % IMP in ΔP vs. Comp. Ex. 2 [ash = 73.6 g/L, soot = 0 g/L] | 85.3 | 87.6 | 84.0 | 85.2 | 81.3 |
| % IMP in ΔP vs. Comp. Ex. 2 [ash = 73.6 g/L, soot = 6 g/L] | 83.6 | 84.1 | 79.4 | 76.2 | 83.4 |
| % IMP in ΔP vs. Comp. Ex. 3 [ash = 0 g/L, soot = 0 g/L] | 66.4 | 72.8 | 63.5 | 67.1 | 55.0 |
| % IMP in ΔP vs. Comp. Ex. 3 [ash = 0 g/L, soot = 6 g/L] | 38.7 | 46.6 | 14.6 | 2.0 | 30.9 |
| % IMP in ΔP vs. Comp. Ex. 3 [ash = 73.6 g/L, soot = 0 g/L] | 62.7 | 68.6 | 59.4 | 62.5 | 52.6 |
| % IMP in ΔP vs. Comp. Ex. 3 [ash = 73.6 g/L, soot = 6 g/L] | 16.5 | 19.0 | −4.5 | −20.6 | 15.8 |

(Ex. 11 through Ex. 15)

| | Inventive Example No. | | | | |
|---|---|---|---|---|---|
| | Ex. 11 | Ex. 12 | Ex. 13 | Ex. 14 | Ex. 15 |
| L1, inches | 0.0446 | 0.0467 | 0.0427 | 0.0446 | 0.0446 |
| L2, inches | 0.0446 | 0.0467 | 0.0427 | 0.0446 | 0.0446 |
| W1, inches | 0.0892 | 0.0934 | 0.0854 | 0.0558 | 0.0535 |
| W2, inches | 0.0446 | 0.0467 | 0.0427 | 0.0446 | 0.0446 |
| L2/L1, inch/inch | 1 | 1 | 1 | 1 | 1 |
| W2/L1, inch/inch | 1 | 1 | 1 | 1 | 1 |
| L1/L2, inch/inch | 1 | 1 | 1 | 1 | 1 |
| W1/W2, inch/inch | 2 | 2 | 2 | 1.25 | 1.2 |
| W1/L1, inch/inch | 2 | 2 | 2 | 1.25 | 1.2 |
| W1/L2, inch/inch | 2 | 2 | 2 | 1.25 | 1.2 |
| Wall thickness, mils | 8.1 | 6 | 10 | 8.1 | 8.1 |
| A1 area, inches² | 0.00199 | 0.00218 | 0.00182 | 0.00199 | 0.00199 |
| A2 area, inches² | 0.00199 | 0.00218 | 0.00182 | 0.00199 | 0.00199 |
| A3 area, inches² | 0.00398 | 0.00436 | 0.00365 | 0.00249 | 0.00239 |
| A4 area, inches² | 0.00398 | 0.00436 | 0.00365 | 0.00249 | 0.00239 |
| A4/A2, inches²/inches² | 2 | 2 | 2 | 1.25 | 1.2 |
| A3/A1, inches²/inches² | 2 | 2 | 2 | 1.25 | 1.2 |
| F1 (area fraction of A1)/all cells | 0.167 | 0.167 | 0.167 | 0.222 | 0.227 |
| F2 (area fraction of A2)/all cells | 0.167 | 0.167 | 0.167 | 0.222 | 0.227 |
| F3 (area fraction of A3)/all cells | 0.333 | 0.333 | 0.333 | 0.278 | 0.273 |
| F4 (area fraction of A4)/all cells | 0.333 | 0.333 | 0.333 | 0.278 | 0.273 |
| Open area fraction of all cells open | 0.75 | 0.82 | 0.70 | 0.73 | 0.73 |
| unit cell area, inches² | 0.0158 | 0.0160 | 0.0156 | 0.0123 | 0.0121 |
| Inlet OFA, % | 50.3 | 54.4 | 46.7 | 52.6 | 52.8 |
| Inlet/outlet area ratio | 2.00 | 2.00 | 2.00 | 2.60 | 2.67 |
| Cells per inch² | 253 | 249 | 256 | 326 | 332 |
| Wall porosity, % | 55 | 45 | 45 | 45 | 45 |
| Mean Pore Size, microns | 11 | 14.5 | 14.5 | 14.5 | 14.5 |
| Filter size, length, inches | 7.5 | 7.5 | 7.5 | 7.5 | 7.5 |
| Filter size, diameter, inches | 13 | 13 | 13 | 13 | 13 |

TABLE 1-continued

| | | | | | |
|---|---|---|---|---|---|
| Gas mass flow rate, Kg/hr | 1700 | 1700 | 1700 | 1700 | 1700 |
| Gas temperature, degrees C. | 380 | 380 | 380 | 380 | 380 |
| Clean ΔP, KPa [ash = 0 g/L, soot = 0 g/L] | 2.2 | 1.59 | 2.47 | 3.95 | 4.17 |
| Soot-loaded ΔP, KPa [ash = 0 g/L, soot = 6 g/L] | 7.33 | 6.22 | 7.7 | 8.88 | 9.17 |
| Ash-loaded ΔP, KPa [ash = 73.6 g/L, soot = 0 g/L] | 2.56 | 1.71 | 2.84 | 4.15 | 4.38 |
| Soot & ash-loaded ΔP KPa, [ash = 73.6 g/L, soot = 6 g/L] | 12.8 | 10.2 | 14.5 | 13.4 | 13.75 |
| % IMP in ΔP vs. Comp. Ex. 1 [ash = 0 g/L, soot = 0 g/L] | 60.6 | 71.6 | 55.8 | 29.3 | 25.4 |
| % IMP in ΔP vs. Comp. Ex. 1 [ash = 0 g/L, soot = 6 g/L] | 31.3 | 41.7 | 27.8 | 16.8 | 14.1 |
| % IMP in ΔP vs. Comp. Ex. 1 [ash = 73.6 g/L, soot = 0 g/L] | 69.7 | 79.8 | 66.4 | 50.9 | 48.2 |
| % IMP in ΔP vs. Comp. Ex. 1 [ash = 73.6 g/L, soot = 6 g/L] | 55.8 | 64.8 | 49.9 | 53.7 | 52.5 |
| % IMP in ΔP vs. Comp. Ex. 2 [ash = 0 g/L, soot = 0 g/L] | 49.1 | 63.2 | 42.8 | 8.6 | 3.5 |
| % IMP in ΔP vs. Comp. Ex. 2 [ash = 0 g/L, soot = 6 g/L] | 33.9 | 43.9 | 30.6 | 19.9 | 17.3 |
| % IMP in ΔP vs. Comp. Ex. 2 [ash = 73.6 g/L, soot = 0 g/L] | 77.8 | 85.2 | 75.4 | 64.0 | 62.0 |
| % IMP in ΔP vs. Comp. Ex. 2 [ash = 73.6 g/L, soot = 6 g/L] | 82.1 | 85.7 | 79.7 | 81.2 | 80.8 |
| % IMP in ΔP vs. Comp. Ex. 3 [ash = 0 g/L, soot = 0 g/L] | 49.8 | 63.7 | 43.6 | 9.8 | 4.8 |
| % IMP in ΔP vs. Comp. Ex. 3 [ash = 0 g/L, soot = 6 g/L] | 25.5 | 36.8 | 21.7 | 9.8 | 6.8 |
| % IMP in ΔP vs. Comp. Ex. 3 [ash = 73.6 g/L, soot = 0 g/L] | 43.9 | 62.5 | 37.7 | 9.0 | 3.9 |
| % IMP in ΔP vs. Comp. Ex. 3 [ash = 73.6 g/L, soot = 6 g/L] | 9.0 | 27.5 | −3.1 | 4.8 | 2.3 |

(Ex. 16 through Ex. 20)

| | Inventive Example No. | | | | |
|---|---|---|---|---|---|
| | Ex. 16 | Ex. 17 | Ex. 18 | Ex. 19 | Ex. 20 |
| L1, inches | 0.0535 | 0.0669 | 0.0892 | 0.0357 | 0.0487 |
| L2, inches | 0.0446 | 0.0446 | 0.0446 | 0.0446 | 0.0487 |
| W1, inches | 0.0892 | 0.0892 | 0.0892 | 0.0892 | 0.0974 |
| W2, inches | 0.0446 | 0.0446 | 0.0446 | 0.0446 | 0.0487 |
| L2/L1, inch/inch | 0.83 | 0.67 | 0.5 | 1.25 | 1 |
| W2/L1, inch/inch | 0.83 | 0.67 | 0.5 | 1.25 | 1 |
| L1/L2, inch/inch | 1.2 | 1.5 | 2 | 0.8 | 1 |
| W1/W2, inch/inch | 2 | 2 | 2 | 2 | 2 |
| W1/L1, inch/inch | 1.67 | 1.33 | 1 | 2.5 | 2 |
| W1/L2, inch/inch | 2 | 2 | 2 | 2 | 2 |
| Wall thickness, mils | 8.1 | 8.1 | 8.1 | 8.1 | 4 |
| A1 area, inches$^2$ | 0.00239 | 0.00298 | 0.00398 | 0.00159 | 0.00237 |
| A2 area, inches$^2$ | 0.00199 | 0.00199 | 0.00199 | 0.00199 | 0.00237 |
| A3 area, inches$^2$ | 0.00477 | 0.00597 | 0.00796 | 0.00318 | 0.00474 |
| A4 area, inches$^2$ | 0.00398 | 0.00398 | 0.00398 | 0.00398 | 0.00474 |
| A4/A2, inches$^2$/inches$^2$ | 2 | 2 | 2 | 2 | 2 |
| A3/A1, inches$^2$/inches$^2$ | 2 | 2 | 2 | 2 | 2 |
| F1 (area fraction of A1)/all cells | 0.182 | 0.200 | 0.222 | 0.148 | 0.167 |
| F2 (area fraction of A2)/all cells | 0.152 | 0.133 | 0.111 | 0.185 | 0.167 |
| F3 (area fraction of A3)/all cells | 0.364 | 0.400 | 0.444 | 0.296 | 0.333 |
| F4 (area fraction of A4)/all cells | 0.303 | 0.267 | 0.222 | 0.370 | 0.333 |
| Open area fraction of all cells open | 0.77 | 0.78 | 0.80 | 0.74 | 0.88 |
| unit cell area, inches$^2$ | 0.0172 | 0.0192 | 0.0225 | 0.0145 | 0.0162 |
| Inlet OFA, % | 53.4 | 57.1 | 61.9 | 46.7 | 58.4 |
| Inlet/outlet area ratio | 2.30 | 2.75 | 3.50 | 1.70 | 2.00 |
| Cells per inch$^2$ | 233 | 209 | 178 | 276 | 246 |
| Wall porosity, % | 45 | 45 | 45 | 45 | 45 |
| Median Pore Size (MPS), microns | 14.5 | 14.5 | 14.5 | 14.5 | 14.5 |
| Filter size, length, inches | 7.5 | 7.5 | 7.5 | 7.5 | 7.5 |
| Filter size, diameter, inches | 13 | 13 | 13 | 13 | 13 |
| Gas mass flow rate, Kg/hr | 1700 | 1700 | 1700 | 1700 | 1700 |
| Gas temperature, degrees C. | 380 | 380 | 380 | 380 | 380 |
| Clean ΔP, KPa [ash = 0 g/L, soot = 0 g/L] | 1.99 | 2.08 | 2.41 | 2.26 | 1.27 |
| Soot-loaded ΔP, KPa [ash = 0 g/L, soot = 6 g/L] | 5.78 | 4.93 | 4.47 | 9.42 | 5.8 |
| Ash-loaded ΔP, KPa [ash = 73.6 g/L, soot = 0 g/L] | 2.1 | 2.12 | 2.4 | 2.77 | 1.32 |

TABLE 1-continued

| | | | | | |
|---|---|---|---|---|---|
| Ash & soot-loaded ΔP, KPa [ash = 73.6 g/L, soot = 6 g/L] | 9.26 | 7.12 | 5.76 | 18.77 | 9.13 |
| % IMP in ΔP vs. Comp. Ex. 1 [ash = 0 g/L, soot = 0 g/L] | 64.4 | 62.8 | 56.9 | 59.6 | 77.3 |
| % IMP in ΔP vs. Comp. Ex. 1 [ash = 0 g/L, soot = 6 g/L] | 45.8 | 53.8 | 58.1 | 11.7 | 45.6 |
| % IMP in ΔP vs. Comp. Ex. 1 [ash = 73.6 g/L, soot = 0 g/L] | 75.1 | 74.9 | 71.6 | 67.2 | 84.4 |
| % IMP in ΔP vs. Comp. Ex. 1 [ash = 73.6 g/L, soot = 6 g/L] | 68.0 | 75.4 | 80.1 | 35.1 | 68.5 |
| % IMP in ΔP vs. Comp. Ex. 2 [ash = 0 g/L, soot = 0 g/L] | 53.9 | 51.9 | 44.2 | 47.7 | 70.6 |
| % IMP in ΔP vs. Comp. Ex. 2 [ash = 0 g/L, soot = 6 g/L] | 47.9 | 55.5 | 59.7 | 15.1 | 47.7 |
| % IMP in ΔP vs. Comp. Ex. 2 [ash = 73.6 g/L, soot = 0 g/L] | 81.8 | 81.6 | 79.2 | 76.0 | 88.6 |
| % IMP in ΔP vs. Comp. Ex. 2 [ash = 73.6 g/L, soot = 6 g/L] | 87.0 | 90.0 | 91.9 | 73.7 | 87.2 |
| % IMP in ΔP vs. Comp. Ex. 3 [ash = 0 g/L, soot = 0 g/L] | 54.6 | 52.5 | 45.0 | 48.4 | 71.0 |
| % IMP in ΔP vs. Comp. Ex. 3 [ash = 0 g/L, soot = 6 g/L] | 41.3 | 49.9 | 54.6 | 4.3 | 41.1 |
| % IMP in ΔP vs. Comp. Ex. 3 [ash = 73.6 g/L, soot = 0 g/L] | 53.9 | 53.5 | 47.4 | 39.3 | 71.1 |
| % IMP in ΔP vs. Comp. Ex. 3 [ash = 73.6 g/L, soot = 6 g/L] | 34.2 | 49.4 | 59.1 | −33.4 | 35.1 |

(Ex. 21 through Ex. 25)

| | Inventive Example No. | | | | |
|---|---|---|---|---|---|
| | Ex. 21 | Ex. 22 | Ex. 23 | Ex. 24 | Ex. 25 |
| L1, inches | 0.0387 | 0.0446 | 0.0446 | 0.0446 | 0.0446 |
| L2, inches | 0.0387 | 0.0446 | 0.0446 | 0.0446 | 0.0446 |
| W1, inches | 0.0774 | 0.0892 | 0.0892 | 0.0892 | 0.0892 |
| W2, inches | 0.0387 | 0.0446 | 0.0446 | 0.0446 | 0.0446 |
| L2/L1, inch/inch | 1 | 1 | 1 | 1 | 1 |
| W2/L1, inch/inch | 1 | 1 | 1 | 1 | 1 |
| L1/L2, inch/inch | 1 | 1 | 1 | 1 | 1 |
| W1/W2, inch/inch | 2 | 2 | 2 | 2 | 2 |
| W1/L1, inch/inch | 2 | 2 | 2 | 2 | 2 |
| W1/L2, inch/inch | 2 | 2 | 2 | 2 | 2 |
| Wall thickness, mils | 14 | 8.1 | 8.1 | 8.1 | 8.1 |
| A1 area, inches$^2$ | 0.00150 | 0.00199 | 0.00199 | 0.00199 | 0.00199 |
| A2 area, inches$^2$ | 0.00150 | 0.00199 | 0.00199 | 0.00199 | 0.00199 |
| A3 area, inches$^2$ | 0.00300 | 0.00398 | 0.00398 | 0.00398 | 0.00398 |
| A4 area, inches$^2$ | 0.00300 | 0.00398 | 0.00398 | 0.00398 | 0.00398 |
| A4/A2, inches$^2$/inches$^2$ | 2 | 2 | 2 | 2 | 2 |
| A3/A1, inches$^2$/inches$^2$ | 2 | 2 | 2 | 2 | 2 |
| F1 (area fraction of A1)/all cells | 0.167 | 0.167 | 0.167 | 0.167 | 0.167 |
| F2 (area fraction of A2)/all cells | 0.167 | 0.167 | 0.167 | 0.167 | 0.167 |
| F3 (area fraction of A3)/all cells | 0.333 | 0.333 | 0.333 | 0.333 | 0.333 |
| F4 (area fraction of A4)/all cells | 0.333 | 0.333 | 0.333 | 0.333 | 0.333 |
| Open area fraction of all cells open | 0.59 | 0.75 | 0.75 | 0.75 | 0.75 |
| Repeating Structural Unit Area, inches$^2$ | 0.0152 | 0.0158 | 0.0158 | 0.0158 | 0.0158 |
| Inlet OFA, % | 39.4 | 50.3 | 50.3 | 50.3 | 50.3 |
| Inlet/outlet area ratio | 2.00 | 2.00 | 2.00 | 2.00 | 2.00 |
| Cells per inch$^2$ | 263 | 253 | 253 | 253 | 253 |
| Wall porosity, % | 45 | 30 | 70 | 45 | 45 |
| Median Pore Size (MPS), microns | 14.5 | 14.5 | 14.5 | 10 | 18 |
| Filter size, length, inches | 7.5 | 7.5 | 7.5 | 7.5 | 7.5 |
| Filter size, diameter, inches | 13 | 13 | 13 | 13 | 13 |
| Gas mass flow rate, Kg/hr | 1700 | 1700 | 1700 | 1700 | 1700 |
| Gas temperature, degrees C. | 380 | 380 | 380 | 380 | 380 |
| Clean ΔP, KPa [ash = 0 g/L, soot = 0 g/L] | 3.73 | 2.18 | 1.94 | 2.41 | 1.88 |
| Soot-loaded ΔP, KPa [ash = 0 g/L, soot = 6 g/L] | 9.99 | 7.35 | 6.79 | 7.77 | 6.62 |
| Ash-loaded ΔP, KPa [ash = 73.6 g/L, soot = 0 g/L] | 4.79 | 2.51 | 2.12 | 2.93 | 2.02 |
| Ash & soot-loaded ΔP, KPa [ash = 73.6 g/L, soot = 6 g/L] | 24.74 | 12.88 | 11.85 | 13.71 | 11.54 |
| % IMP in ΔP vs. Comp. Ex. 1 [ash = 0 g/L, soot = 0 g/L] | 33.3 | 61.0 | 65.3 | 56.9 | 66.4 |
| % IMP in ΔP vs. Comp. Ex. 1 [ash = 0 g/L, soot = 6 g/L] | 6.4 | 31.1 | 36.4 | 27.2 | 38.0 |
| % IMP in ΔP vs. Comp. Ex. 1 [ash = 73.6 g/L, soot = 0 g/L] | 43.3 | 70.3 | 74.9 | 65.3 | 76.1 |

TABLE 1-continued

| | | | | | |
|---|---|---|---|---|---|
| % IMP in ΔP vs. Comp. Ex. 1 [ash = 73.6 g/L, soot = 6 g/L] | 14.5 | 55.5 | 59.1 | 52.6 | 60.1 |
| % IMP in ΔP vs. Comp. Ex. 2 [ash = 0 g/L, soot = 0 g/L] | 13.7 | 49.5 | 55.1 | 44.2 | 56.5 |
| % IMP in ΔP vs. Comp. Ex. 2 [ash = 0 g/L, soot = 6 g/L] | 9.9 | 33.7 | 38.8 | 29.9 | 40.3 |
| % IMP in ΔP vs. Comp. Ex. 2 [ash = 73.6 g/L, soot = 0 g/L] | 58.5 | 78.2 | 81.6 | 74.6 | 82.5 |
| % IMP in ΔP vs. Comp. Ex. 2 [ash = 73.6 g/L, soot = 6 g/L] | 65.4 | 82.0 | 83.4 | 80.8 | 83.8 |
| % IMP in ΔP vs. Comp. Ex. 3 [ash = 0 g/L, soot = 0 g/L] | 14.8 | 50.2 | 55.7 | 45.0 | 57.1 |
| % IMP in ΔP vs. Comp. Ex. 3 [ash = 0 g/L, soot = 6 g/L] | −1.5 | 25.3 | 31.0 | 21.0 | 32.7 |
| % IMP in ΔP vs. Comp. Ex. 3 [ash = 73.6 g/L, soot = 0 g/L] | −5.0 | 45.0 | 53.5 | 35.7 | 55.7 |
| % IMP in ΔP vs. Comp. Ex. 3 [ash = 73.6 g/L, soot = 6 g/L] | −75.8 | 8.5 | 15.8 | 2.6 | 18.0 |

(Ex. 26 through Ex. 27)

| | Inventive Example No. | | | |
|---|---|---|---|---|
| | Ex. 26 | Ex. 27 | Ex. 28 | Ex. 29 |
| L1, inches | 0.0387 | 0.0446 | 0.0446 | 0.0446 |
| L2, inches | 0.0387 | 0.0892 | 0.0446 | 0.0446 |
| W1, inches | 0.1548 | 0.0446 | 0.0892 | 0.0669 |
| W2, inches | 0.0387 | 0.0446 | 0.0558 | 0.0669 |
| L2/L1, inch/inch | 1 | 2 | 1 | 1 |
| W2/L1, inch/inch | 1 | 1 | 1.25 | 1.5 |
| L1/L2, inch/inch | 1 | 0.5 | 1 | 1 |
| W1/W2, inch/inch | 4 | 1 | 1.6 | 1 |
| W1/L1, inch/inch | 4 | 1 | 2 | 1.5 |
| W1/L2, inch/inch | 4 | 0.5 | 2 | 1.5 |
| Wall thickness, mils | 14 | 8.1 | 8.1 | 8.1 |
| A1 area, inches$^2$ | 0.00150 | 0.00199 | 0.00249 | 0.00298 |
| A2 area, inches$^2$ | 0.00150 | 0.00398 | 0.00249 | 0.00298 |
| A3 area, inches$^2$ | 0.00599 | 0.00199 | 0.00398 | 0.00298 |
| A4 area, inches$^2$ | 0.00599 | 0.00398 | 0.00398 | 0.00298 |
| A4/A2, inches$^2$/inches$^2$ | 4 | 1 | 1.6 | 1 |
| A3/A1, inches$^2$/inches$^2$ | 4 | 1 | 1.6 | 1 |
| F1 (area fraction of A1)/all cells | 0.100 | 0.167 | 0.192 | 0.250 |
| F2 (area fraction of A2)/all cells | 0.100 | 0.333 | 0.192 | 0.250 |
| F3 (area fraction of A3)/all cells | 0.400 | 0.167 | 0.308 | 0.250 |
| F4 (area fraction of A4)/all cells | 0.400 | 0.333 | 0.308 | 0.250 |
| Open area fraction of all cells open | 0.64 | 0.75 | 0.76 | 0.75 |
| Repeating Structural Unit Area, inches$^2$ | 0.0234 | 0.0158 | 0.0170 | 0.0158 |
| Inlet OFA, % | 38.5 | 50.3 | 52.7 | 56.6 |
| Inlet/outlet area ratio | 1.50 | 2.00 | 2.25 | 3 |
| Cells per inch$^2$ | 171 | 253 | 235 | 253 |
| Wall porosity, % | 45 | 45 | 45 | 45 |
| Median Pore Size (MPS), microns | 14.5 | 14.5 | 14.5 | 14.5 |
| Filter size, length, inches | 7.5 | 7.5 | 7.5 | 7.5 |
| Filter size, diameter, inches | 13 | 13 | 13 | 13 |
| Gas mass flow rate, Kg/hr | 1700 | 1700 | 1700 | 1700 |
| Gas temperature, degrees C. | 380 | 380 | 380 | 380 |
| Clean ΔP, KPa [ash = 0 g/L, soot = 0 g/L] | 2.62 | 2.04 | 2.49 | 3.6 |
| Soot-loaded ΔP, KPa [ash = 0 g/L, soot = 6 g/L] | 8.76 | 6.98 | 6.88 | 7.39 |
| Ash-loaded ΔP, KPa [ash = 73.6 g/L, soot = 0 g/L] | 3.79 | 2.34 | 2.85 | 3.9 |
| Ash & soot-loaded ΔP, KPa [ash = 73.6 g/L, soot = 6 g/L] | 24.1 | 12.1 | 11.15 | 10.5 |
| % IMP in ΔP vs. Comp. Ex. 1 [ash = 0 g/L, soot = 0 g/L] | 53.1 | 63.5 | 55.5 | 35.6 |
| % IMP in ΔP vs. Comp. Ex. 1 [ash = 0 g/L, soot = 6 g/L] | 17.9 | 34.6 | 35.5 | 30.7 |
| % IMP in ΔP vs. Comp. Ex. 1 [ash = 73.6 g/L, soot = 0 g/L] | 55.1 | 72.3 | 66.3 | 53.8 |
| % IMP in ΔP vs. Comp. Ex. 1 [ash = 73.6 g/L, soot = 6 g/L] | 16.7 | 58.2 | 61.5 | 63.7 |
| % IMP in ΔP vs. Comp. Ex. 2 [ash = 0 g/L, soot = 0 g/L] | 39.4 | 52.8 | 42.4 | 16.7 |
| % IMP in ΔP vs. Comp. Ex. 2 [ash = 0 g/L, soot = 6 g/L] | 21.0 | 37.1 | 38.0 | 33.4 |
| % IMP in ΔP vs. Comp. Ex. 2 [ash = 73.6 g/L, soot = 0 g/L] | 67.2 | 79.7 | 75.3 | 66.2 |

TABLE 1-continued

| | | | | |
|---|---|---|---|---|
| % IMP in ΔP vs. Comp. Ex. 2 [ash = 73.6 g/L, soot = 6 g/L] | 66.3 | 83.1 | 84.4 | 85.3 |
| % IMP in ΔP vs. Comp. Ex. 3 [ash = 0 g/L, soot = 0 g/L] | 40.2 | 53.4 | 43.2 | 17.8 |
| % IMP in ΔP vs. Comp. Ex. 3 [ash = 0 g/L, soot = 6 g/L] | 11.0 | 29.1 | 30.1 | 24.9 |
| % IMP in ΔP vs. Comp. Ex. 3 [ash = 73.6 g/L, soot = 0 g/L] | 16.9 | 48.7 | 37.5 | 14.5 |
| % IMP in ΔP vs. Comp. Ex. 3 [ash = 73.6 g/L, soot = 6 g/L] | −71.3 | 14.0 | 20.8 | 25.4 |

TABLE 2

Comparative Examples (Ex. 1 through Ex. 3)

| | Comp. Ex. 1 |
|---|---|
| Inlet (large) cell wall length, inches | 0.0504 |
| Inlet (large) cell wall width, inches | 0.0504 |
| Outlet (small) cell wall length, inches | 0.0390 |
| Outlet (small) cell wall width, inches | 0.0390 |
| Inlet (large) cell area for each inlet cell, inches$^2$ | 0.00254 |
| Outlet (small) cell area for each outlet cell, inches$^2$ | 0.00152 |
| Inlet/outlet area ratio (large cell/small cell) | 1.67 |
| Inlet (large) cell perimeter, inches | 0.202 |
| Outlet (small) cell perimeter, inches | 0.156 |
| Wall thickness, mils | 8.1 |
| Area fraction of large cells/all cells | 0.626 |
| Area fraction of small cells/all cells | 0.374 |
| Unit cell area, inches$^2$ | 0.0111 |
| Inlet open frontal area, % | 45.6 |
| Outlet open frontal area, % | 27.3 |
| Open frontal area, all cells open, % | 72.8 |
| Cells per inch$^2$ | 359 |
| Wall porosity, % | 45 |
| Median Pore Size (MPS), microns | 14.5 |
| Filter size, length, inches | 7.5 |
| Filter size, diameter, inches | 13 |
| Gas mass flow rate, Kg/hr | 1700 |
| Gas temperature, degrees C. | 380 |
| Clean ΔP, KPa, [ash = 0 g/L, soot = 0 g/L] | 5.59 |
| Soot-loaded ΔP, KPa [ash = 0 g/L, soot = 6 g/L] | 10.67 |
| Ash-loaded ΔP, KPa [ash = 73.6 g/L, soot = 0 g/L] | 8.45 |
| Ash & soot-loaded ΔP, KPa [ash = 73.6 g/L, soot = 6 g/L] | 28.94 |

| | Comp. Ex. 2 | Comp. Ex. 3 |
|---|---|---|
| L1, inches | 0.0445 | 0.0496 |
| L2, inches | 0.0445 | 0.0496 |
| W1, inches | 0.0445 | 0.0496 |
| W2, inches | 0.0445 | 0.0496 |
| L1/L1, inch/inch | 1 | 1 |
| L2/L1, inch/inch | 1 | 1 |
| W2/L1, inch/inch | 1 | 1 |
| W1/L1, inch/inch | 1 | 1 |
| W1/W2, inch/inch | 1 | 1 |
| Wall thickness, mils | 8.1 | 8.1 |
| A1, inches$^2$ | 0.00198 | 0.00246 |
| A2, inches$^2$ | 0.00198 | 0.00246 |
| A3, inches$^2$ | 0.00198 | 0.00246 |
| A4, inches$^2$ | 0.00198 | 0.00246 |
| A1 (cell type: inlet or outlet) | outlet | inlet |
| A2 (cell type: inlet or outlet) | inlet | inlet |
| A3 (cell type: inlet or outlet) | inlet | inlet |
| A4 (cell type: inlet or outlet) | outlet | outlet |
| A4/A2, inches$^2$/inches$^2$ | 1 | 1 |
| A3/A1, inches$^2$/inches$^2$ | 1 | 1 |
| F1 (area fraction of A1)/all cells | 0.25 | 0.25 |
| F2 (area fraction of A2)/all cells | 0.25 | 0.25 |

TABLE 2-continued

Comparative Examples (Ex. 1 through Ex. 3)

| | Comp. Ex. 2 | Comp. Ex. 3 |
|---|---|---|
| F3 (area fraction of A3)/all cells | 0.25 | 0.25 |
| F4 (area fraction of A4)/all cells | 0.25 | 0.25 |
| Open area fraction of all cells open | 0.716 | 0.739 |
| unit cell area, inches$^2$ | 0.0111 | 0.0133 |
| Inlet OFA, % | 35.8 | 55.4 |
| Inlet/outlet area ratio | 1 | 3 |
| Cells per inch$^2$ | 362 | 300 |
| Wall porosity, % | 45 | 45 |
| Median Pore Size (MPS), microns | 14.5 | 14.5 |
| Filter size, length, inches | 7.5 | 7.5 |
| Filter size, diameter, inches | 13 | 13 |
| Gas mass flow rate, Kg/hr | 1700 | 1700 |
| Gas temperature, degrees C. | 380 | 380 |
| Clean ΔP, KPa [ash = 0 g/L, soot = 0 g/L] | 4.32 | 4.38 |
| Soot-loaded ΔP, KPa [ash = 0 g/L, soot = 6 g/L] | 11.09 | 9.84 |
| Ash-loaded ΔP, KPa [ash = 73.6 g/L, soot = 0 g/L] | 11.54 | 4.56 |
| Ash & Soot-loaded ΔP, KPa [ash = 73.6 g/L, soot = 6 g/L] | 71.45 | 14.07 |

Embodiments wherein $L_1=L_2$ and $W_1>W_2$ are shown in Ex. 1-15, and Ex. 20-26, and 28 wherein Ex. 28 has all rectangles. Embodiments where $L_1 \neq L_2$ are shown in Ex. 16-19 and Ex. 27. Combination embodiments wherein both $L_1 \neq L_2$ and $W_1>W_2$ are shown in Ex. 16-19. An example wherein $L_1 \neq L_2$ and $W_1=W_2$ is shown in Ex. 27. In particular, in Ex. 27, the configuration comprises $L_1<L_2$. An example wherein $L_1=L_2$ and $W_1=W_2$, but wherein is shown in Ex. 29. In particular, in Ex. 29, $W_1>L_2$. However, optionally, the repeating structural unit may comprise $L_1=L_2$ and $W_1=W_2$, but $W_1<L_2$.

Figure 2:
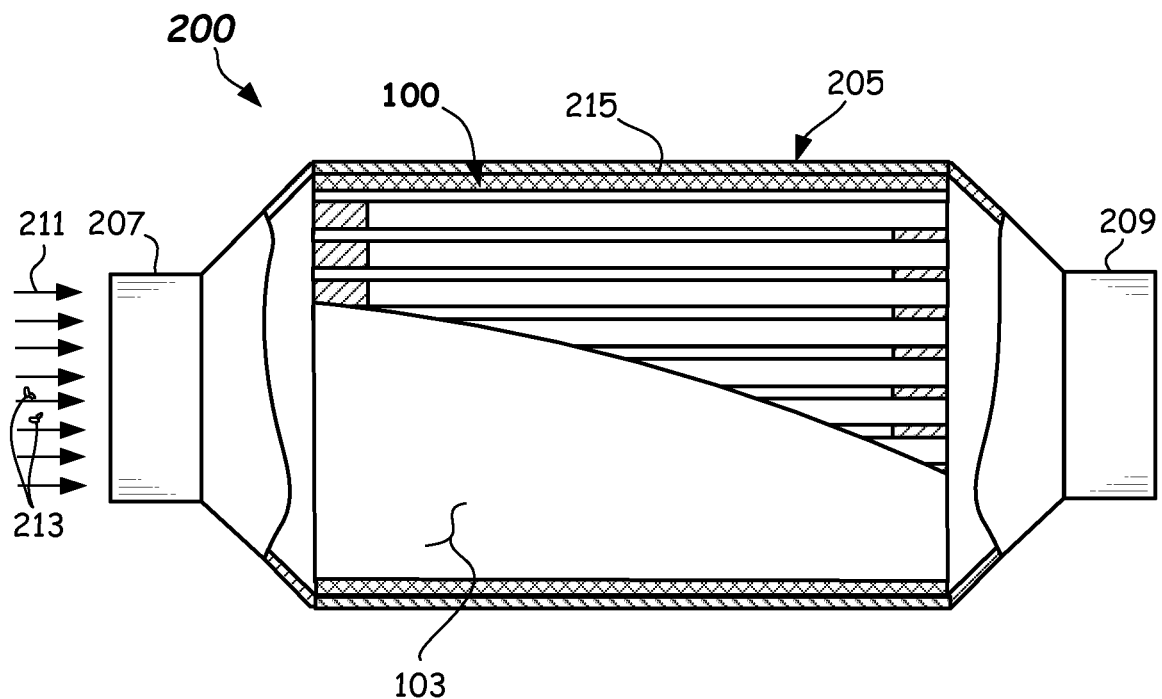
FIG. 2 illustrates a partially cross-sectioned side view of a particulate filter comprising an inventive honeycomb body according to one or more embodiments.

Referring now to FIG. 2, a particulate filter 200 comprising the honeycomb body 100 (or optionally, honeycomb bodies 400-700) is shown. In the depicted embodiment, the honeycomb body 100 is received inside of a can 205, such as a metal housing or other confining structure. Can 205 may comprise a first end cap comprising an inlet 207 configured to receive engine exhaust 211 containing soot and/or inorganic particulates, and a second end cap comprising an outlet 209 configured to exhaust a filtered gas flow, wherein a large percentage (e.g., approximately 99% or greater) of the particulates 213 (e.g., soot and/or inorganic matter) in the engine exhaust have been removed/filtered and are carried in the inlet channels 120 and open interconnected porosity of the honeycomb body 100. The skin 103 of the honeycomb body 100 may have a member 215 in contact therewith, such as a high-temperature insulation material, to cushion the honeycomb body 100 from shock and stress. Any suitable construction of the member 215 may be used, such as one-piece construction, or two or more layer construction. The honeycomb body 100 and member 215 may be received in the can 205 by any suitable means, such as by funneling into the central body and then one or more of the first and second end caps may be secured (e.g., welded) onto the central body for form the inlet 207 and the outlet 209. Other, two-piece construction or clam-shell construction of the can 205 may optionally be used.

Figure 3:
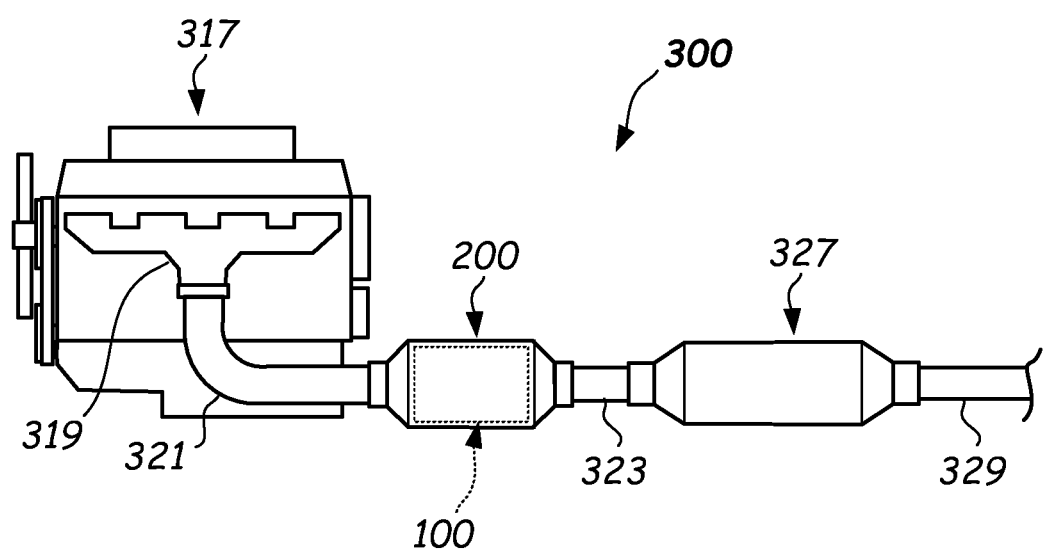
FIG. 3 illustrates a schematic side view of an exhaust system of an internal combustion engine comprising a particulate filter containing an inventive honeycomb body according to one or more embodiments.

FIG. 3 illustrates an exhaust system 300 coupled to an engine 317 (e.g., a gasoline engine or diesel engine). The exhaust system 300 may comprise a manifold 319 for coupling to the exhaust ports of the engine 317, a first collection tube 321 configured to couple between the manifold 319 and the particulate filter 200 containing the honeycomb body 100 therein. Coupling may be by any suitable clamping bracket or other attachment mechanism. The first collection tube 321 may be integral with the manifold 319 in some embodiments. In some embodiments, the particulate filter 200 may couple directly to the manifold without an intervening member. The exhaust system 300 may further comprise a second collection tube 323 coupled to the particulate filter 200 and to a second exhaust component 327. The second exhaust component 327 may be a muffler, a catalytic converter, or even a second particulate filter, for example. A tailpipe 329 (shown truncated) or other conduit or component may be coupled to the second exhaust component 327. Other exhaust system components may be included, such as oxygen sensors, ports for urea injection, and the like (not shown). The engine 317 may comprise one particulate filter 200 for each bank (side set of cylinders) of the engine 317, or optionally, the first collection tube 321 may be a Y-tube collecting soot from each bank and directing the soot to the particulate filter 200. Utilizing the particulate filter 200 comprising the honeycomb body 100 according to embodiments described herein may result in long intervals between regeneration events due to the relatively large ash and soot loading capability of the particulate filter 200. Moreover, the relatively low back pressure exerted by the honeycomb body 100 in the exhaust system 300 may allow for free exhaust flow and thus substantially minimal power reduction of the engine 317. The exhaust system 300 comprising the honeycomb body 100 preferably provides, in some embodiments, very low clean pressure drop, low soot-loaded and ash-loaded pressure drop, as well as low rate of increase in pressure drop as a function of soot and/or ash loading. The exhaust system 300 is described as comprising honeycomb body 100 shown and described with reference to FIGS. 1A-1F. However, other honeycomb bodies 400, 500, 600, and 700 may be substituted therein.

Referring now to FIG. 8A-8F, a honeycomb extrusion die 800 configured to manufacture the honeycomb bodies 100-700 according to embodiments of the disclosure is provided. The honeycomb bodies 100-700 may be formed by extrusion of a batch mixture, such as is described, for example, in U.S. Pat. Nos. 3,885,977, 5,332,703, 6,391,813, 7,017,278, 8,974,724, WO2014/046912, and WO2008/066765, through the honeycomb extrusion die 800 to produce a green honeycomb body. The green honeycomb body may then be dried, such as described in U.S. Pat. Nos. 9,038,284, 9,335,093, 7,596,885, and 6,259,078, for example. The green honeycomb body may then be fired, such as described in U.S. Pat. Nos. 9,452,578, 9,446,560, 9,005,517, 8,974,724, 6,541,407, and 6,221,308 to form the honeycomb body 100-700 with a porous ceramic wall honeycomb structure comprising the geometry (or structure) and microstructure described herein.

The honeycomb extrusion die 800 comprises a die body 839, a die inlet face 842 configured to receive extrudable batch mixture, and a die outlet face 844 opposite from the die inlet face 842 configured to expel batch material in the form of a green honeycomb body having a honeycomb structure. The extrusion die 800 may be coupled to an extruder (not shown) that receives the batch, such as a ram extruder or screw extruder such as a twin-screw extruder, wherein the extruder forces the batch material under pressure through the extrusion die 800.

The honeycomb extrusion die 800 comprises a plurality of feedholes 845 (a few labeled) extending from the die inlet face 842 into the die body 839, and an intersecting with an array of slots 848 (a few labeled) extending into the die body 839 from the die outlet face 844 and connecting with the plurality of feedholes 845. The feedholes 845 supply batch to the array of slots 848. The intersecting array of slots 848 comprises first slots 850 (a few labeled) extending in a straight line entirely across the die outlet face 844 (e.g., vertically as shown), and a second slots 852 which may be orthogonal to the first slots 850 and may also extend in a straight line fully across the die outlet face 844 (e.g., horizontally as shown). The intersecting array of slots 848 form an array of unit die cells 824 that are repeated across at least some of the die outlet face 844, and may encompass the substantial entirely the die outlet face 844 in some embodiments. The unit die cells 824 may be arranged, as shown, in a side-by-side abutting relationship in the horizontal direction, and stacked one atop another in the vertical direction, for example. The honeycomb extrusion die 800 may comprise a skin-forming portion 800S comprising a skin-forming mask 849 (e.g., a ring-shaped article) that interfaces with skin forming feedholes 845S to form an extruded skin on the extruded green honeycomb body formed during the extrusion method.

Each of the unit die cells 824 comprises a first die component 825, a second die component 830, a third die component 835, and a fourth die component 840, which may be arranged as shown in FIG. 8C. Each die component 825-840 comprises a die pin (P1-P4, respectively) and a width Ws of a slot of the intersecting array of slots 848 around the perimeter (half the width Ws on each side). First die component 825 comprises, in cross-section, a length $L_{1'}$, a width $W_{2'}$, and a cross-sectional area $A_{1'}$. The second die component 830 comprises, in cross-section, a length $L_{2'}$, the width $W_{2'}$, and a cross-sectional area $A_{2'}$. The third die component 835 comprises, in cross-section, the length $L_{1'}$, a width $W_{1'}$, and a cross-sectional area $A_{3'}$, and the fourth die component 840 comprises, in cross-section, the length $L_{2'}$, the width $W_{1'}$, and a cross-sectional area $A_{4'}$, wherein fourth die component 840 comprises a rectangular shape in cross-section. The cross-section is through the pins (P1-P4) in a plane parallel to the die outlet face 844.

In accordance with embodiments, the die components 825-840 may be configured in either of a first configuration or a second configuration, that is, the configuration of the die components 825-840 can be selected to provide at least one of a first configuration or a second configuration, wherein the first configuration is:

$W_{1'} > W_{2'}$ and $L_{1'} = L_{2'}$ and $A_{4'} = A_{3'} > A_{2'} = A_{1'}$.

and the second configuration is selected from one of the following:

$L_{1'} \neq L_{2'}$ and $A_{4'} > A_{3'} > A_{2'} < A_{1'}$,
$L_{1'} \neq L_{2'}$ and $A_{4'} > A_{2'} > A_{3'} < A_{1'}$,
$L_{1'} \neq L_{2'}$ and $A_{3'} > A_{4'} > A_{1'} < A_{2'}$, or
$L_{1'} \neq L_{2'}$ and $W_{1'} = W_{2'}$ and $A_{4'} = A_{2'} > A_{3'} = A_{1'}$.

In one or more embodiments of the first configuration, the unit die cell 824 comprises a first configuration and structure wherein $W_{1'} > W_{2'}$ and $L_{1'} = L_{2'}$ and the third die component 835 and the fourth die component 840 comprise the same quadrilateral (e.g., rectangular) shape, and the first die component 825 and the second die component 830 comprise the same quadrilateral shape, and the unit die cell 824 has an outer peripheral shape that is also quadrilateral (e.g., rectangular or square).

One or more embodiments of the first combination comprise a unit die cell 824 that comprises structure wherein the area of the die components 825-840 are related by the relationship: $A_{4'}=A_{3'}>A_{2'}=A_{1'}$. In particular, a ratio of $A_3/A_{1'}$ may be $A_3/A_{1'} \geq 1.2$, or even $A_3/A_{1'} \geq 1.5$, or even $A_3/A_{1'} \geq 2.0$, or even $A_3/A_{1'} \geq 2.5$, or even $A_3/A_{1'} \geq 4.0$. In some embodiments, $A_3/A_{1'}$ may be $1.2 \leq A_3/A_{1'} \leq 10$, or even $1.2 \leq A_3/A_{1'} \leq 4.0$, or even $1.2 \leq A_3/A_{1'} \leq 2.5$. Similarly, the ratio of $A_4/A_{2'}$ may be $A_4/A_{2'} \geq 1.2$, or even $A_4/A_{2'} \geq 1.5$, or even $A_4/A_{2'} \geq 2.0$, or even $A_4/A_{2'} \geq 2.5$, or even $A_4/A_{2'} \geq 4.0$. In some embodiments, $A_4/A_{2'}$ may be $1.2 \leq A_4/A_{2'} \leq 10$, or even $1.2 \leq A_4/A_{2'} \leq 4.0$, or even $1.2 \leq A_4/A_{2'} \leq 2.5$.

In the second combination, $L_{1'} \neq L_{2'}$. In some embodiments of the second combination, the unit die cell 824 may have $L_{2'}>L_{1'}$. In other embodiments of the second combination, the unit die cell 824 may have $L_{1'}>L_{2'}$.

In a first embodiment of the second combination (See Ex. 19), the honeycomb extrusion die 800 comprises the unit die cell 824, which is selected so that a $L_{2'}>L_{1'}$ and $W_{1'}>W_{2'}$, and so that $A_{4'}>A_{3'}>A_{2'}<A_{1'}$. In the first embodiment, the unit die cell 824 may have $W_{2'}>L_{1'}$.

In the second embodiment of the second combination, the honeycomb extrusion die 800 comprises the unit die cell 824, which is selected so that a $L_{2'}>L_{1'}$ and $W_{1'}>W_{2'}$, and such that $A_{4'}>A_{2'}>A_{3'}<A_{1'}$. In the second embodiment, the unit die cell 824 may have $W_{2'}<L_{1'}$.

In the third embodiment of the second combination (See Ex. 16 through Ex. 18), the honeycomb extrusion die 800 comprises the unit die cell 824, which is selected so that $L_{1'}>L_{2'}$ and $W_{1'}>W_{2'}$, and $A_3>A_4>A_1<A_{2'}$.

In the fourth embodiment of the second combination (See Ex. 27), the honeycomb extrusion die 800 comprises the unit die cell 824, which is selected so that a $L_{2'}>L_{1'}$ and $W_{1'}=W_{2'}$, and the unit die cell 824 is selected so that $A_{4'}=A_{2'}>A_{3'}=A_{1'}$.

In embodiments where $W_{1'}>W_{2'}$, a ratio of $W_1/W_{2'}$ may be $1.2 \leq W_1/W_{2'} \leq 4.0$, or even between $1.2 \leq W_1/W_{2'} \leq 2.5$. In embodiments where $L_{2'} \geq L_{1'}$, a ratio of ratio of $L_2/L_{1'}$ may be $L_2/L_{1'} \geq 1.2$, or even $L_2/L_{1'} \geq 1.5$, or even $L_2/L_{1'} \geq 2.0$, or even $L_2/L_{1'} \geq 2.5$, or even $L_2/L_{1'} \geq 4.0$, or even $L_2/L_{1'} \geq 10$. In some embodiments, $L_2/L_{1'}$ may be $1.2 \leq L_2/L_{1'} \leq 10$, or even $1.2 \leq L_2/L_{1'} \leq 4.0$, or even $1.2 \leq L_2/L_{1'} \leq 2.5$.

In embodiments where $L_{2'}<L_{1'}$, a ratio of ratio of $L_2/L_{1'}$ may be $0.8 \geq L_2/L_{1'} \geq 0.1$, or even $L_2/L_{1'}$ may be $0.8 \geq L_2/L_{1'} \geq 0.4$, or even $L_2/L_{1'}$ may be $0.8 \geq L_2/L_{1'} \geq 0.65$ in some embodiments. However, the fourth die component 840 is always rectangular in cross-section. In some embodiments, $L_2/L_{1'}$ may be $L_2/L_{1'} \geq 1.0$. In other embodiments, $0.5 \leq L_2/L_{1'} \leq 1.25$.

Figure 8D:
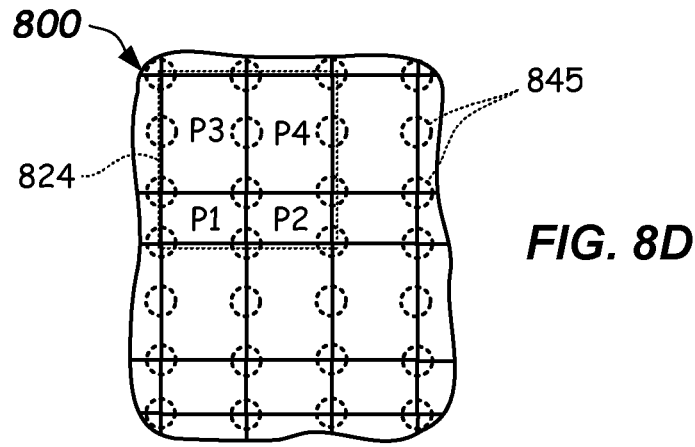
FIGS. 8D-8F illustrate partial front views of honeycomb extrusion dies illustrating various feedhole configurations according to one or more embodiments.
Figure 8E:
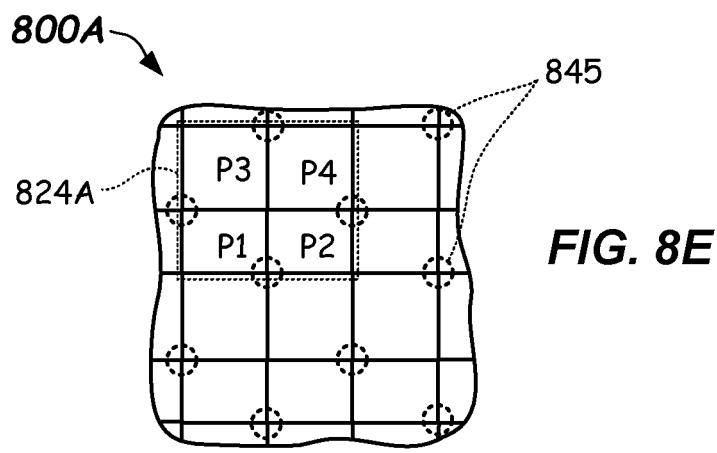
Figure 8F:
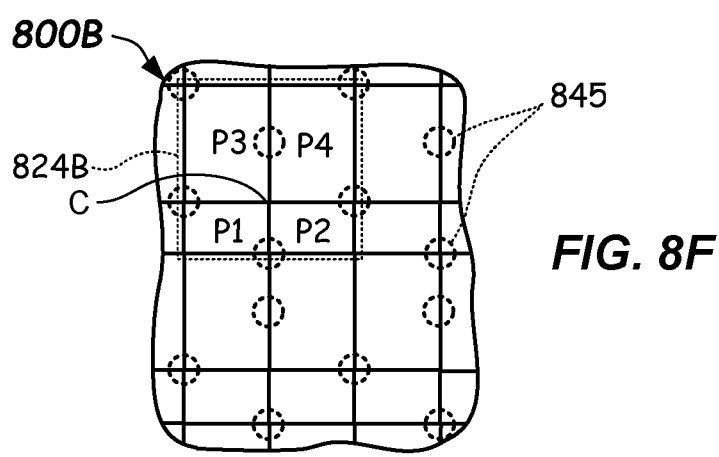

FIGS. 8D-8F illustrate several embodiments of honeycomb extrusion dies 800, 800A, 800B, which comprise different feedhole patterns (feedholes 845 shown as dotted circles and slots shown as solid lines). FIG. 8D illustrates a first embodiment wherein feedholes 845 are included at every intersection of the slots and also midway between intersections of the larger die pins P3, P4 of the unit die cell 824. This feedhole configuration may be used in embodiments of the honeycomb extrusion die 800 where the ratio of $W_2/W_{1'}$ is relatively larger, such as greater than 2.0, for example.

FIG. 8E illustrates a second embodiment of honeycomb extrusion die 800A wherein feedholes 845 are included at every other intersection of the slots in both directions so that feedholes 845 are included on the sides, but not the corners, of the die unit cell 824A. The FIG. 8E embodiment of honeycomb extrusion die 800A may be used in embodiments where the ratio of $W_2/W_{1'}$ is relatively smaller, such as less than or equal to about 1.5, for example.

FIG. 8F illustrates a third embodiment of honeycomb extrusion die 800B wherein feedholes 845 are included at every other horizontal intersection of the horizontal slots, and at vertical locations so that the intersection at the center C of every die unit cell 824B is fed batch from four directions. The FIG. 8E embodiment, may be used in embodiments where the ratio of $W_2/W_{1'}$ is relatively smaller, such as less than or equal to 2.0, for example.

Figure 10:
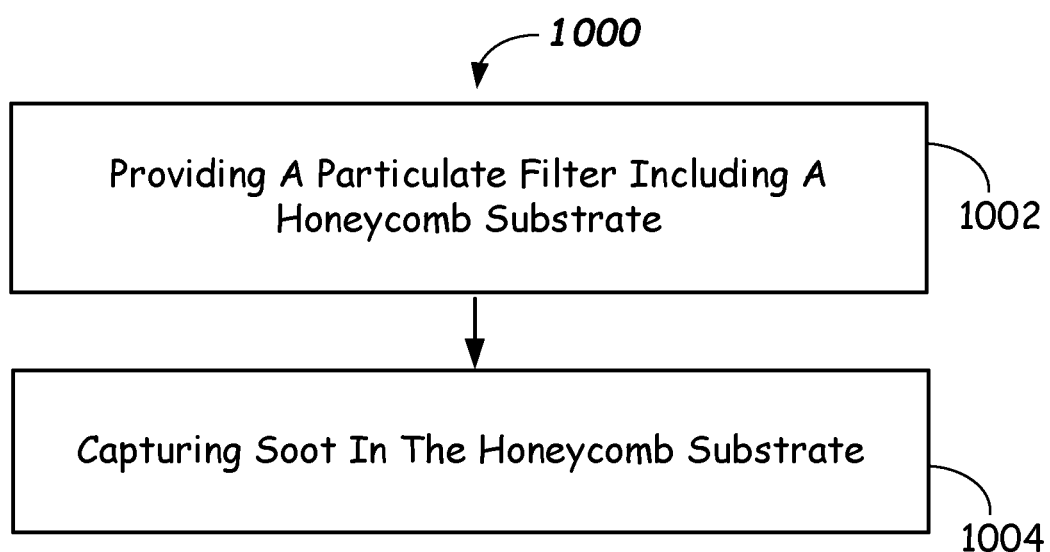
FIG. 10 illustrates a flowchart depicting a method of operating a particulate filter including an inventive honeycomb body according to one or more embodiments.

FIG. 10 describes a method 1000 of filtering particulates according to one or more embodiments. The method 1000 comprises, in 1002, providing a honeycomb body (e.g., honeycomb body 100, 400, 500, 600, or 700) as described herein and embodied in a particulate filter (e.g., particulate filter 200), and, in 1004, capturing soot in the honeycomb body.

The foregoing description discloses example embodiments of the disclosure. Modifications of the above-disclosed apparatus, systems, and methods which fall within the scope of the disclosure will be readily apparent. For example, any combination of the microstructure parameters disclosed herein may be applied to honeycomb bodies embodiments disclosed herein. For example, disclosed parameters of % P, MPS, Tw, Db, and CD may be applied in combination with any of the disclosed repeating structural units 124-724. Accordingly, while the present disclosure includes certain example embodiments, it should be understood that other embodiments may fall within the scope of the disclosure, as defined by the appended claims.

What is claimed is:

1. A honeycomb body, comprising:
   intersecting porous walls in a matrix comprising a pattern of repeating structural units, wherein each of the repeating structural units comprises a first cell, a second cell, a third cell, and a fourth cell, wherein the first cell, second cell, third cell, and fourth cell all extend parallel to each other in an axial direction from an inlet face to an outlet face and have a quadrilateral cross-section in a transverse plane orthogonal to the axial direction and are plugged to define inlet channels and outlet channels within the repeating structural unit, wherein each of the repeating structural units comprises:
   a first channel defined by the first cell comprising, in transverse cross-section, a length $L_1$, a width $W_2$, and a cross-sectional area $A_1$, the first channel having a first sidewall and a second sidewall orthogonal to the first sidewall;
   a second channel defined by the second cell and comprising, in transverse cross-section, a length $L_2$, the width $W_2$, and a cross-sectional area $A_2$, and sharing the second sidewall with the first channel;
   a third channel defined by the third cell comprising, in transverse cross-section, the length $L_1$, a width $W_1$, and a cross-sectional area $A_3$, comprising a third sidewall and sharing the first sidewall with the first channel; and
   a fourth channel defined by the fourth cell and comprising, in transverse cross-section, the length $L_2$, the width $W_1$, and a cross-sectional area $A_4$, and sharing a fourth sidewall with the second channel and the third sidewall with the third channel, and
   wherein the first channel, the second channel, and the third channel are inlet channels and the fourth channel is an outlet channel having a rectangular shape in transverse cross-section, and at least one of $W_1 \geq W_2$ and $L_1 \neq L_2$, and the repeating structural unit comprises a quadrilateral outer perimeter.

2. The honeycomb body of claim 1, wherein each of the cells in the repeating structural unit is rectangular in transverse cross-section.

3. The honeycomb body of claim 1, wherein the first cell and the second cell in the repeating structural unit are rectangular in transverse cross-section.

4. The honeycomb body of claim 1, wherein the first cell and the second cell in the repeating structural unit are square in transverse cross-section.

5. The honeycomb body of claim 1, wherein the third cell and the fourth cell in the repeating structural unit are rectangular in transverse cross-section.

6. The honeycomb body of claim 1, wherein the pattern of repeating structural units comprises repeating structural units disposed in a stacked configuration wherein the first channels do not share a wall with any fourth channel.

7. The honeycomb body of claim 1, wherein the pattern of repeating structural units comprises repeating structural units disposed in a staggered configuration wherein the first channels share a wall with the fourth channels.

8. The honeycomb body of claim 1, wherein all of the porous walls extend continuously across the inlet face.

9. The honeycomb body of claim 1, comprising a skin on an outer radial periphery of the honeycomb body and all the porous walls extend continuously across the honeycomb body between sections of the skin.

10. The honeycomb body of claim 1, comprising: $A_4 \geq A_3 > A_2 \geq A_1$.

11. The honeycomb body of claim 10, comprising: $A_3/A_1 \geq 1.2$.

12. The honeycomb body of claim 10, comprising: $A_3/A_1 \leq 10$ and inlet OFA>38%, wherein inlet OFA is inlet open frontal area.

13. The honeycomb body of claim 10, wherein $A_3/A_1 \leq 4.0$.

14. The honeycomb body of claim 10, wherein $A_3/A_1 \leq 2.5$.

15. The honeycomb body of claim 10, wherein $1.2 \leq A_3/A_1 \leq 10$.

16. The honeycomb body of claim 10, wherein $1.2 \leq A_3/A_1 \leq 4.0$.

17. The honeycomb body of claim 10, wherein $1.2 \leq A_3/A_1 \leq 2.5$.

18. The honeycomb body of claim 10, wherein
$1.86 \text{ mm}^2 \leq A_3 \leq 12.8 \text{ mm}^2$, and
$0.97 \text{ mm}^2 \leq A_1 \leq 2.57 \text{ mm}^2$.

19. The honeycomb body of claim 10, wherein $A_4/A_2 \geq 1.2$.

20. The honeycomb body of claim 10, wherein $A_4/A_2 \leq 2.5$.

21. The honeycomb body of claim 10, wherein $1.2 \leq A_4/A_2 \leq 10$.

22. The honeycomb body of claim 10, wherein $1.2 \leq A_4/A_2 \leq 2.5$.

23. The honeycomb body of claim 10, comprising:
$0.97 \text{ mm}^2 \leq A_2 \leq 2.57 \text{ mm}^2$, and
$A_4$ is between $1.86 \text{ mm}^2 \leq A_4 \leq 12.8 \text{ mm}^2$.

24. The honeycomb body of claim 10, wherein $W_1/W_2 \geq 1.2$.

25. The honeycomb body of claim 10, comprising $W_1/W_2 \leq 10.0$.

26. The honeycomb body of claim 10, wherein $1.2 \leq W_1/L_1 \leq 10$ and $1.2 \leq W_1/L_2 \leq 10$.

27. The honeycomb body of claim 10, comprising:
an area fraction of a cross-sectional area of the fourth channel of the repeating structural unit comprising an outlet cell divided by a cross-sectional area of all channels of the repeating structural unit is between 0.22 and 0.46.

28. The honeycomb body of claim 1, comprising:
0.006 inch (0.152 mm)$\leq$Tw$\leq$0.010 inch (0.254 mm), wherein Tw is a wall thickness of the porous walls;
40%$\leq$% P$\leq$60%, wherein % P is an open porosity of the porous walls;
10 microns$\leq$MPS$\leq$16 microns, wherein MPS is a median pore size of pores in the open porosity of the porous walls;
38%$\leq$inlet OFA$\leq$62%, wherein inlet OFA is an open frontal area of the honeycomb body; and
$1.2 \leq W_1/W_2 \leq 2.5$.

29. The honeycomb body of claim 1, wherein the porous walls comprise cordierite, silicon carbide (SiC), aluminum titanate, alumina ($Al_2O_3$), silicon aluminum oxynitride ($Al_6O_2N_6Si$), mullite, zeolite, fused silica, or porous metal, or combinations thereof.

* * * * *